(12) United States Patent
Hirokane

(10) Patent No.: US 6,572,467 B1
(45) Date of Patent: Jun. 3, 2003

(54) PROCESS FOR DE-BONING A TURKEY

(76) Inventor: Bryan Hirokane, 1242 Honokahua St., Honolulu, HI (US) 96825

( * ) Notice: Subject to any disclaimer, the term of this patent is extended or adjusted under 35 U.S.C. 154(b) by 0 days.

(21) Appl. No.: 10/072,554

(22) Filed: Feb. 7, 2002

(51) Int. Cl.7 ............................................. A22C 17/02
(52) U.S. Cl. ..................................................... 452/135
(58) Field of Search ............................... 452/135, 136, 452/148, 160, 56, 272

(56) References Cited

U.S. PATENT DOCUMENTS

| | | | | |
|---|---|---|---|---|
| 3,942,222 A | * | 3/1976 | Strandine et al. | 452/148 |
| 5,088,957 A | * | 2/1992 | Gagiardi, Jr. | 452/149 |
| 5,368,520 A | * | 11/1994 | Koch et al. | 452/136 |
| 5,660,583 A | * | 8/1997 | Roberts | 452/136 |
| 6,280,311 B1 | * | 8/2001 | Kuck | 452/135 |

OTHER PUBLICATIONS

"The Making of a Cook", Kamman, Madeline; Atheneum. 1971.*
"The Good Housekeeping Illustrated Cookbook", Good Housekeeping. 1989.*
"The Southern Living Cookbook", Payne, Susan Carlisle; Southern Living. 1987.*
"How to carve meat". PageWise, Inc. 2001.*
"Broiler Chicken Deboning", Denton, J.H.; Texas Agricultural experiment Station. Jun. 1988.*

* cited by examiner

Primary Examiner—Charles T. Jordan
Assistant Examiner—Judith A. Nelson
(74) Attorney, Agent, or Firm—Woodard, Emhardt, Moriarty, McNett & Henry LLP

(57) ABSTRACT

A method of de-boning a fowl comprises; making an incision along a leg bone, exposing a leg joint between the leg bone and the rest of the turkey, severing the leg joint; removing two segments of a wing; making an incision along a third segment of the wing; exposing a wing joint between the wing bone of the third segment and the rest of the turkey, severing the wing joint; making an incision along the back of the fowl, separating the flesh of the back from the backbone and ribcage; severing a joint between the thighbone and the rest of the fowl; making an incision along a shoulderbone; removing a ribcage from the rest of the fowl; separating flesh from a breastbone and removing the breastbone; removing a wishbone; making an incision along a thighbone, exposing and severing the thigh joint.

2 Claims, 31 Drawing Sheets

PROCESS FOR DE-BONING A TURKEY

BACKGROUND OF THE INVENTION

Typically, turkeys, and other fowl, are cooked with the bones left inside. In part, this is because it can be difficult to remove the bones from the turkey, adding greatly to the time necessary to prepare the meal. De-boning the turkey prior to cooking by known methods may also be undesirable because it involves cutting the turkey into multiple pieces, making for a less visually appealing presentation.

However, there are problems with cooking a turkey that still has the bones in it. The turkey is quite large, and requires both a large cooking dish and a great deal of oven space. Furthermore, the time needed to cook the turkey is much greater—in some cases, as much as 3 hours greater. And, of course, even after the turkey is cooked, the bones must still be removed, either by carving during serving, or during consumption by the individuals actually consuming the turkey.

Therefore, what is needed is a method for de-boning a turkey prior to cooking such that it can be cooked more rapidly and with less oven space, which leaves the turkey in substantially one piece to provide a good visual presentation, and eliminates the need for carving around the bones during serving or consumption.

SUMMARY OF THE INVENTION

A first embodiment method of de-boning a fowl according to the present invention comprises: Making an incision along a leg bone, exposing a leg joint between the leg bone and the rest of the turkey, and severing the leg joint, such that the leg bone is removed while leaving substantially all flesh of the leg attached to the rest of the fowl; removing two segments of a wing, such that a third segment of the wing is left attached to the rest of the turkey, making an incision along a wing bone of the third segment of the wing; exposing a wing joint between the wing bone of the third segment and the rest of the turkey, and severing the wing joint, such that the wing bone is removed while leaving the flesh of the wing attached to the rest of the fowl; making an incision along the back of the fowl, and separating the flesh of the back from the backbone and ribcage; severing a joint between the thighbone and the rest of the fowl; making an incision along a shoulderbone, such that flesh surrounding the shoulderbone can be pulled free while remaining attached to the rest of the fowl; removing a ribcage from the rest of the fowl; separating flesh from a breastbone and removing the breastbone; removing a wishbone; making an incision along a thighbone, exposing a thigh joint connecting the thighbone and the rest of the fowl, severing the thigh joint, such that the thighbone can be removed while leaving substantially all flesh of the thigh attached to the rest of the fowl.

DETAILED DESCRIPTION OF THE PREFERRED EMBODIMENT

Figure 1:
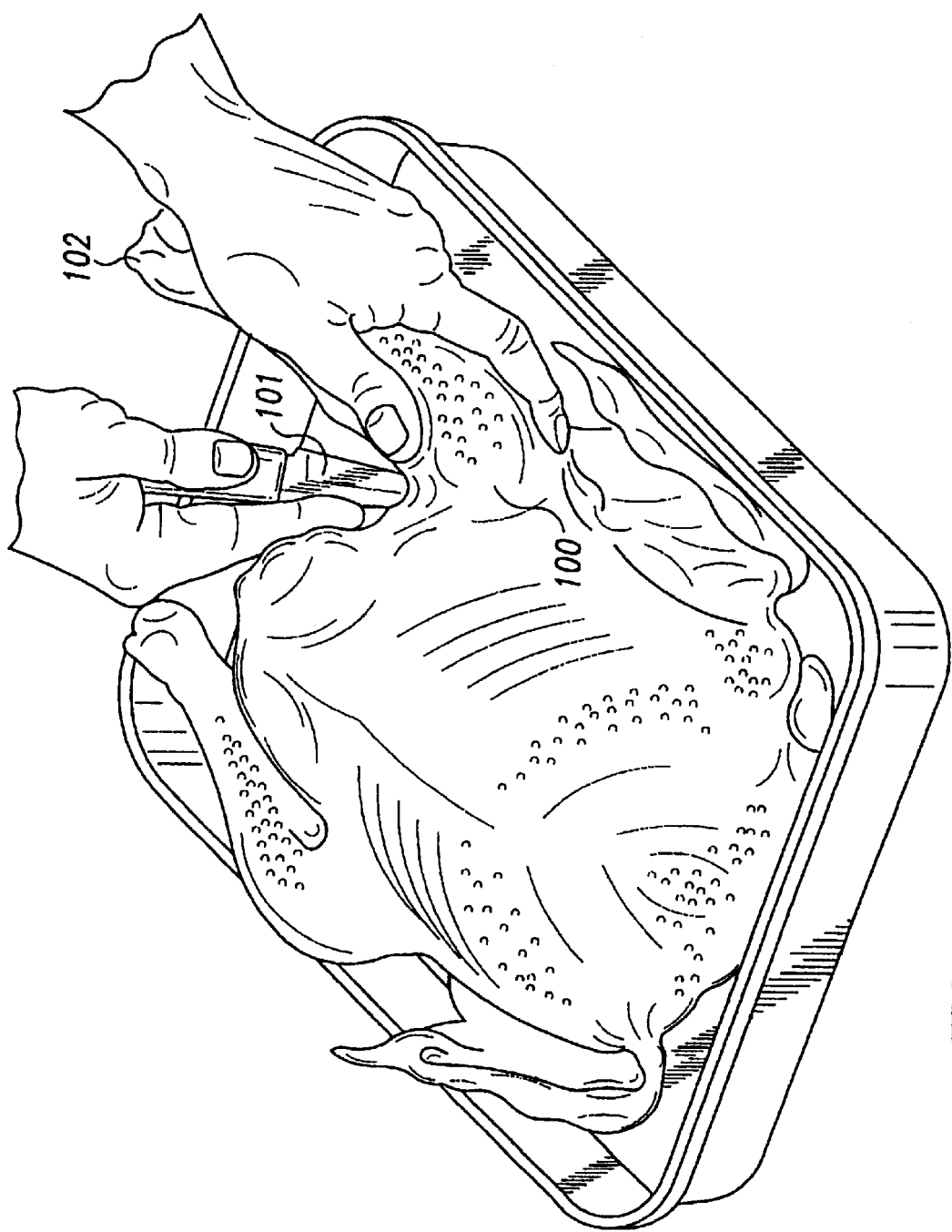
FIG. 1 is a perspective view illustrating the position at which an incision in a leg of the turkey is begun.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates. In particular, although the preferred embodiment is discussed in terms of de-boning a turkey, it will be appreciated by those skilled in the art that a method according to the present invention can be used to de-bone virtually any other fowl, such as a chicken, duck, goose, etc.

A de-boning process according to the present invention is much easier if the turkey is fully thawed. Therefore, if the process is to be performed on a frozen turkey, the turkey should be permitted to completely thaw before the process is begun. Of course, the process can also be performed on a fresh turkey that has never been frozen. In the preferred embodiment, the de-boning process is begun by placing the turkey on it's back in a suitable pan or on a suitable surface, as shown in FIG. 1. Next, the leg bones are removed. Using the knife 101, an incision is made along the inside of one of the legs. FIG. 1 illustrates how the incision is preferably started, at the hip joint 100, and extending towards the knee 102. The incision preferably extends along substantially all of the length of the leg bone.

Figure 2:
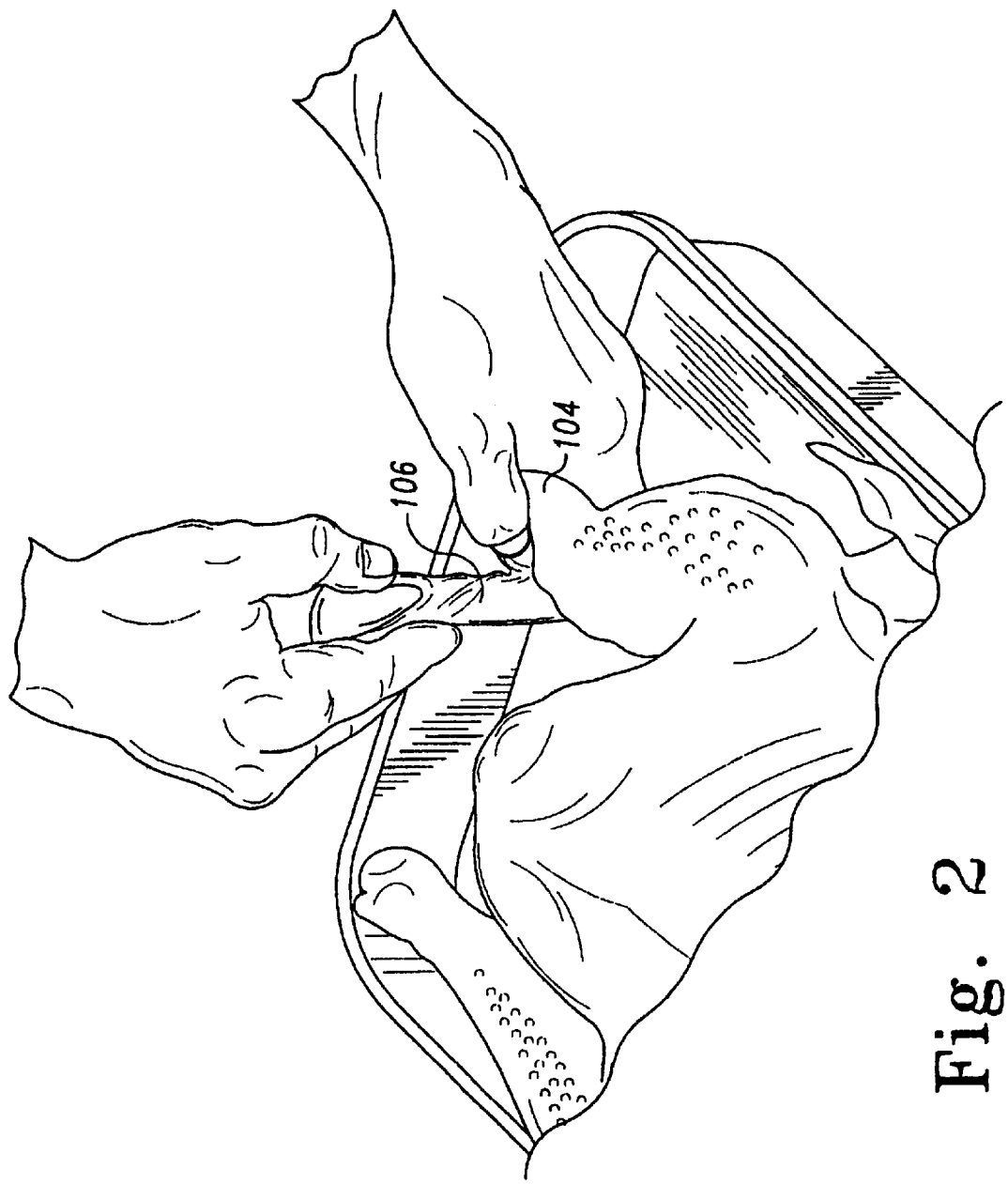
FIG. 2 is a perspective view illustrating manual separation of a leg bone from the flesh.
Figure 3:
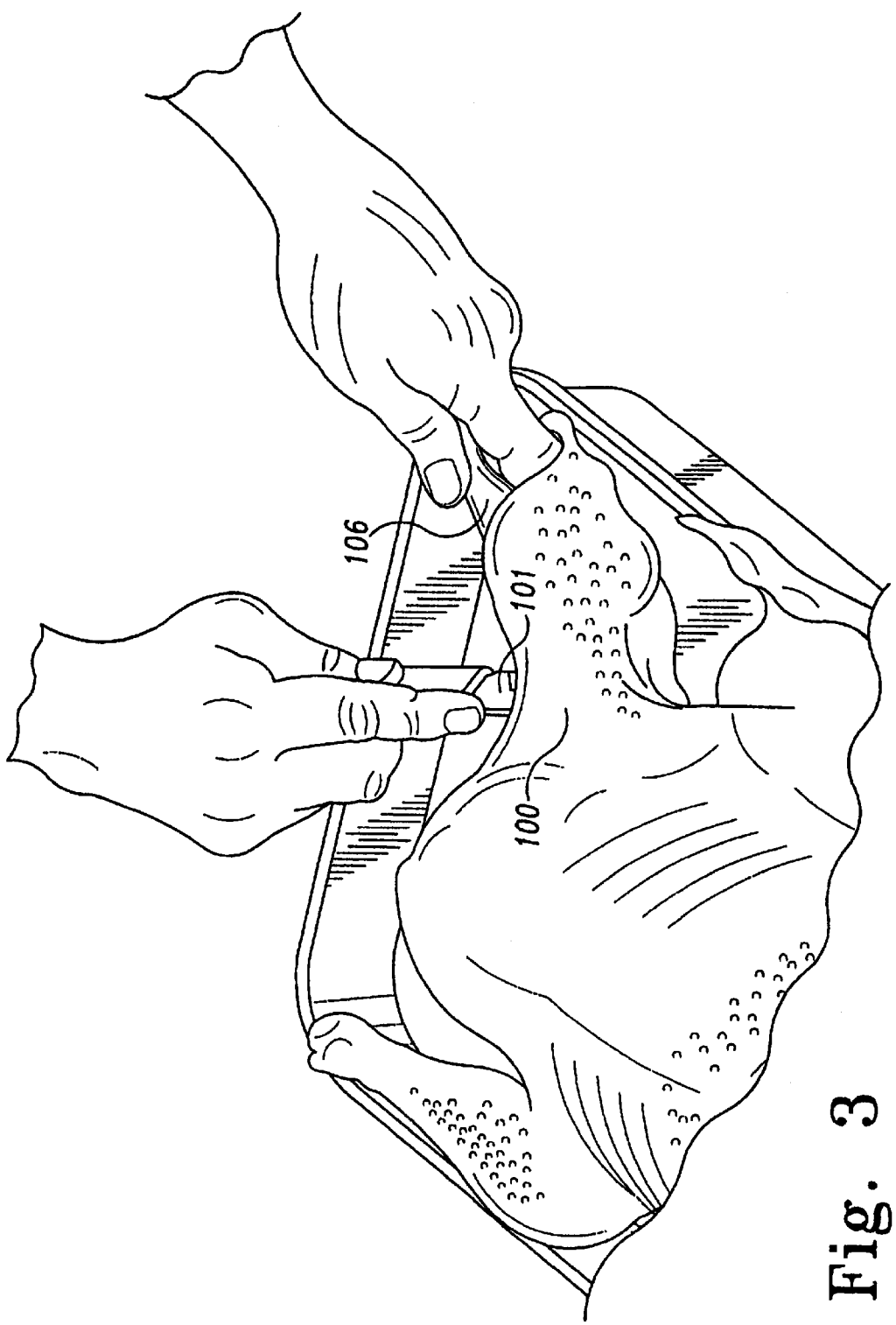
FIG. 3 is a perspective view illustrating severing a joint to permit the removal of the leg bone.
Figure 4:
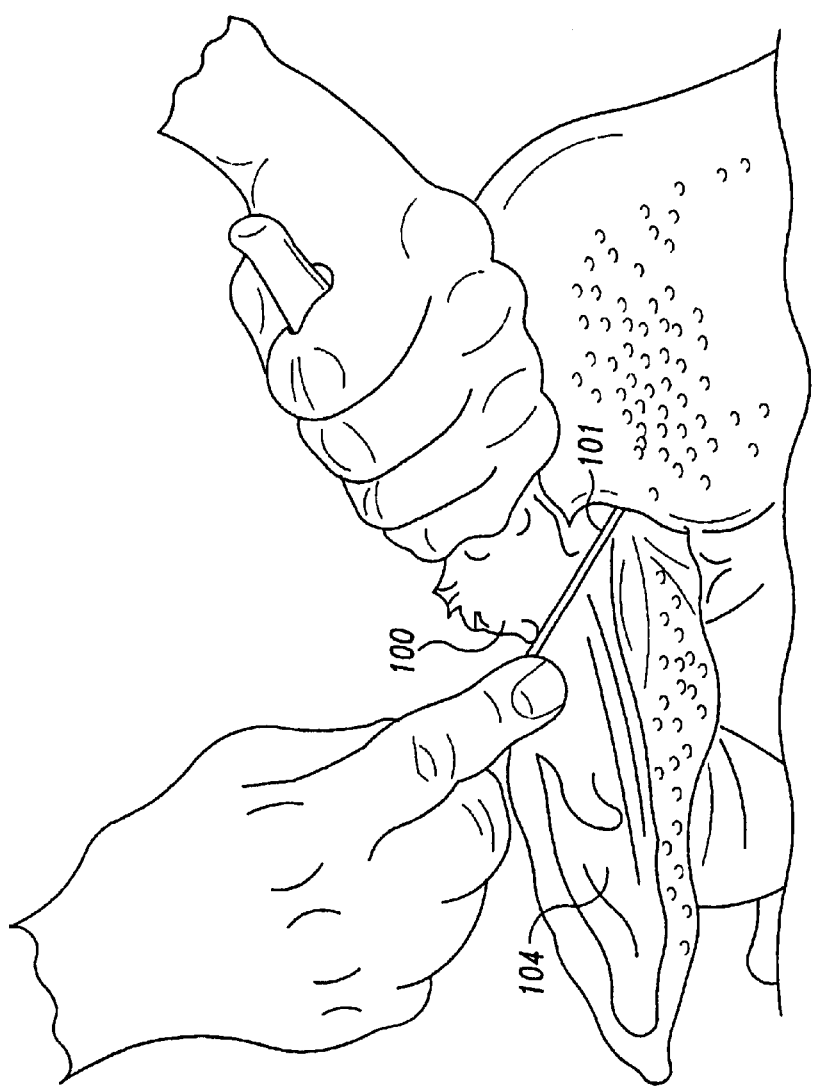
FIG. 4 is a perspective view illustrating severing a joint to permit the removal of the leg bone.

As shown in FIG. 2, the flesh of the leg is separated from the bone by hand by gripping the portion of the flesh of the leg 104 furthest from the body of the turkey and pulling it back up along the bone 106. The bone 106 itself is then gripped, and the tip of the knife is inserted into the hip joint 100, as shown in FIG. 3, to sever the bone 106 from the hip. In order to completely free the bone from the joint, it may be necessary to lay open the flesh of the leg 104 and to cut through the joint with the blade of the knife, as shown in FIG. 4. The process shown in FIGS. 2–4 is then repeated on the other leg, in order to completely remove the other leg bone. It will be appreciated that the flesh of the leg has not been detached from the rest of the turkey, because the bone 102 and hip joint 100 were first exposed before the joint 100 was severed.

Figure 5:
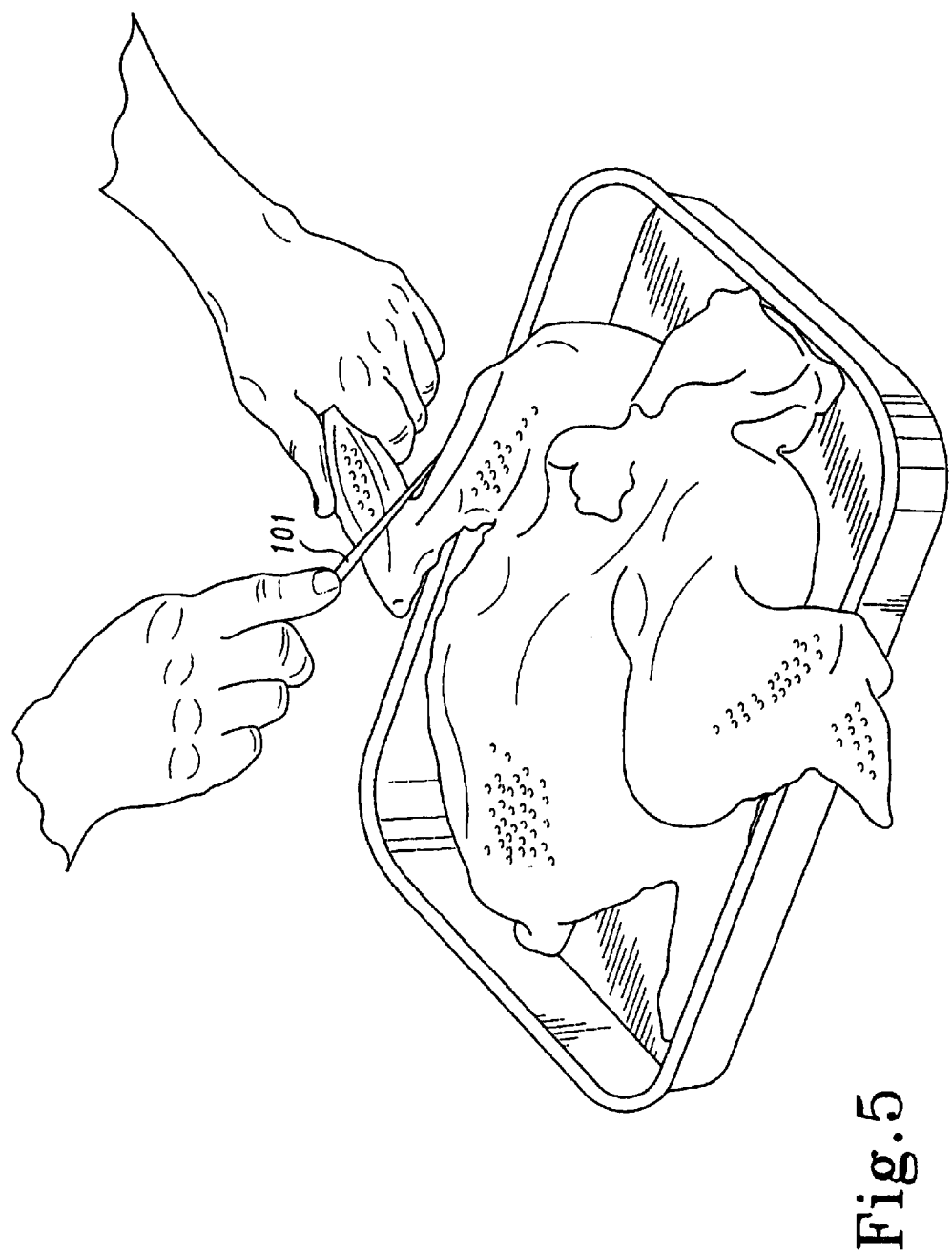
FIG. 5 is a perspective view illustrating severing two segments of a wing.
Figure 6:
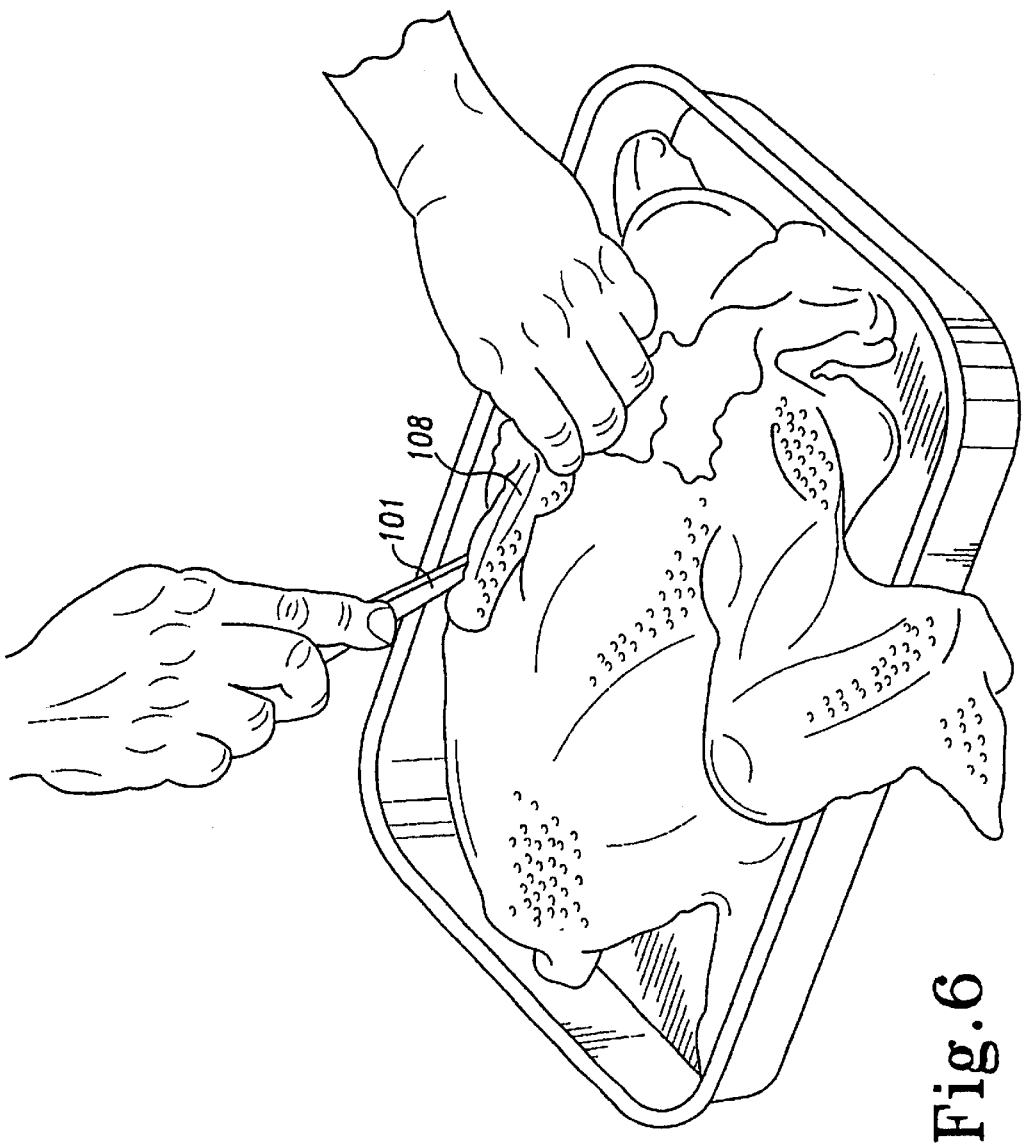
FIG. 6 is a perspective view illustrating the position of an incision in the first segment of a wing.
Figure 7:
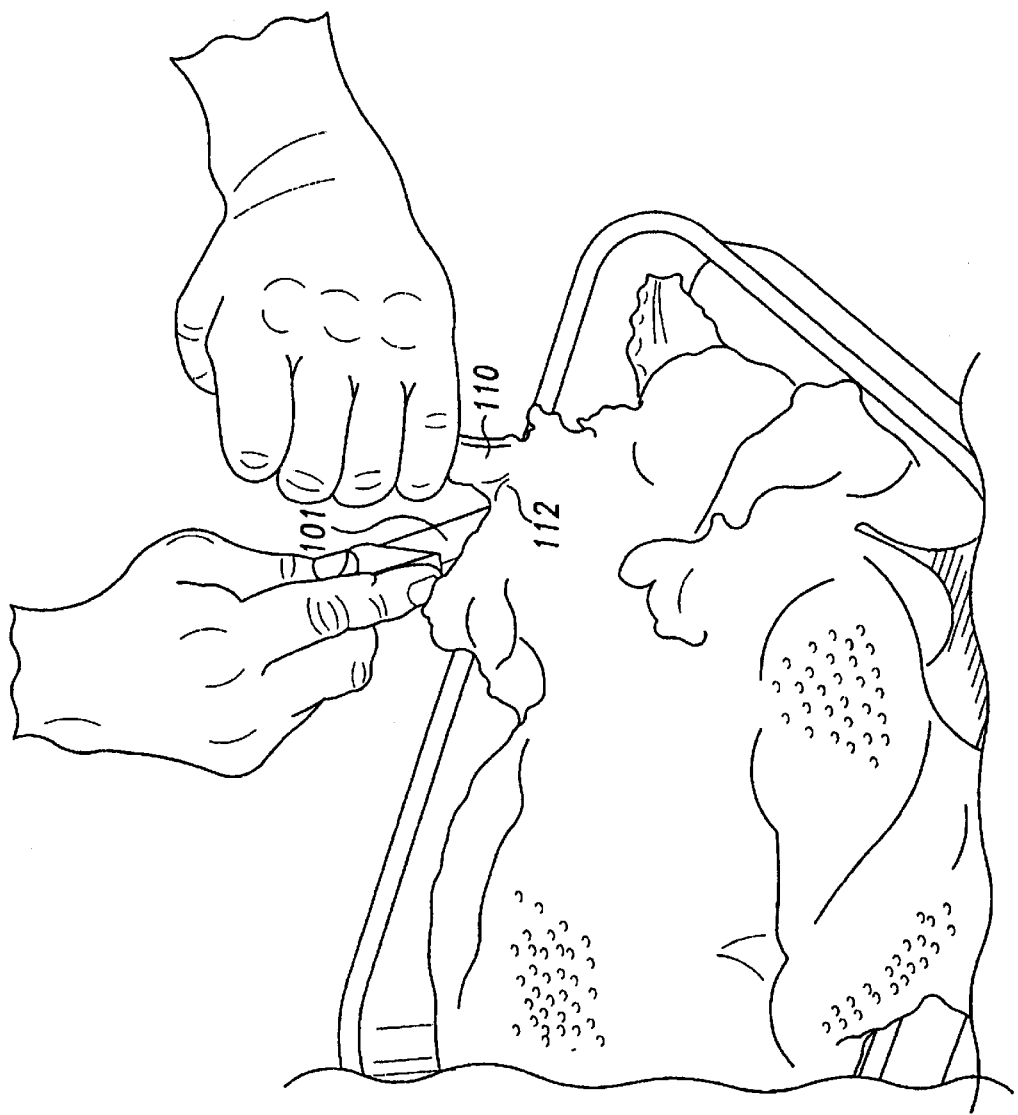
FIG. 7 is a perspective view illustrating severing a joint to permit the removal of a wing bone.

Next, the wing bones are removed. Two segments of one of the wings are first cut away, as shown in FIG. 5. Then an incision is made along the entire outside edge of the remaining wing segment 108, as shown in FIG. 6. The wing bone 110 is then pulled from the flesh of the wing so that the shoulder joint 112 can be severed and the bone removed, as shown in FIG. 7. The process shown in FIGS. 5–7 is then repeated on the other wing. It will be appreciated that, as with the legs, the flesh of the wings has not been detached from the rest of the turkey, because the wing bone 110 was again exposed before the joint was severed.

Figure 8:
FIG. 8 is a perspective view illustrating the position at which to begin an incision along the backbone.
Figure 9:
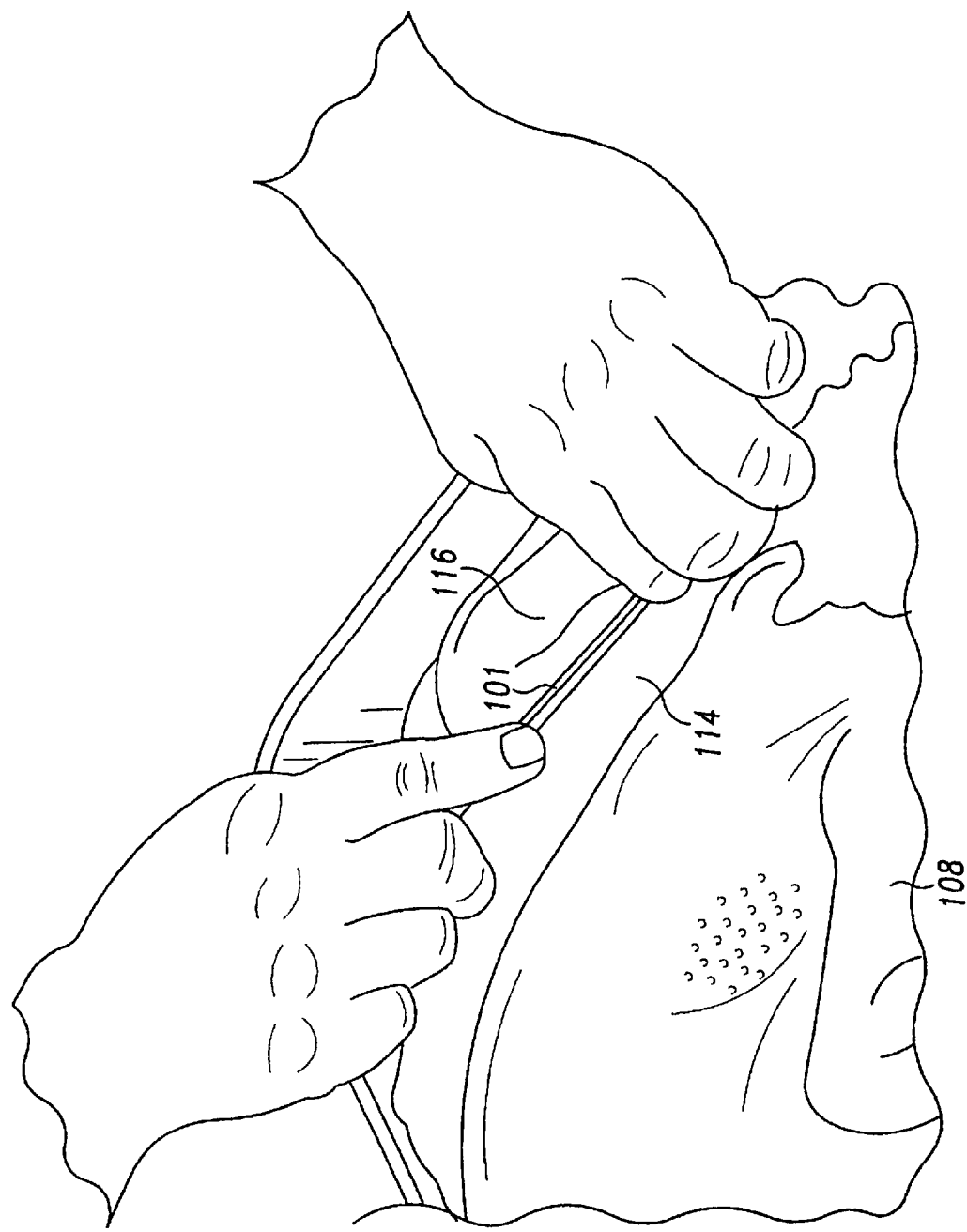
FIG. 9 is a perspective view illustrating separation of the backbone and ribs from the flesh.

The turkey is then flipped over so that its top is facing upwards, as shown in FIG. 8. An incision is made along the length of the backbone, preferably starting from the front of the turkey and proceeding to the back. The knife is then turned sideways in order to slide it along one side of the exposed ribcage 114, such that the flesh of the back 116 is cut away from the backbone and ribs, as shown in FIG. 9. Those skilled in the art will appreciate that it may be helpful to grip the knife further towards the tip than usual, including, possibly, by the blade, in order to provide the optimal leverage for this separating. The incision along the ribs is expanded down along the ribs in a series of passes, each pass beginning at the front of the turkey and proceeding to the back. At this point, the incision should not go past the shoulder bone, so that the flesh surrounding the shoulder bone remains attached to the flesh of the back.

Figure 10:
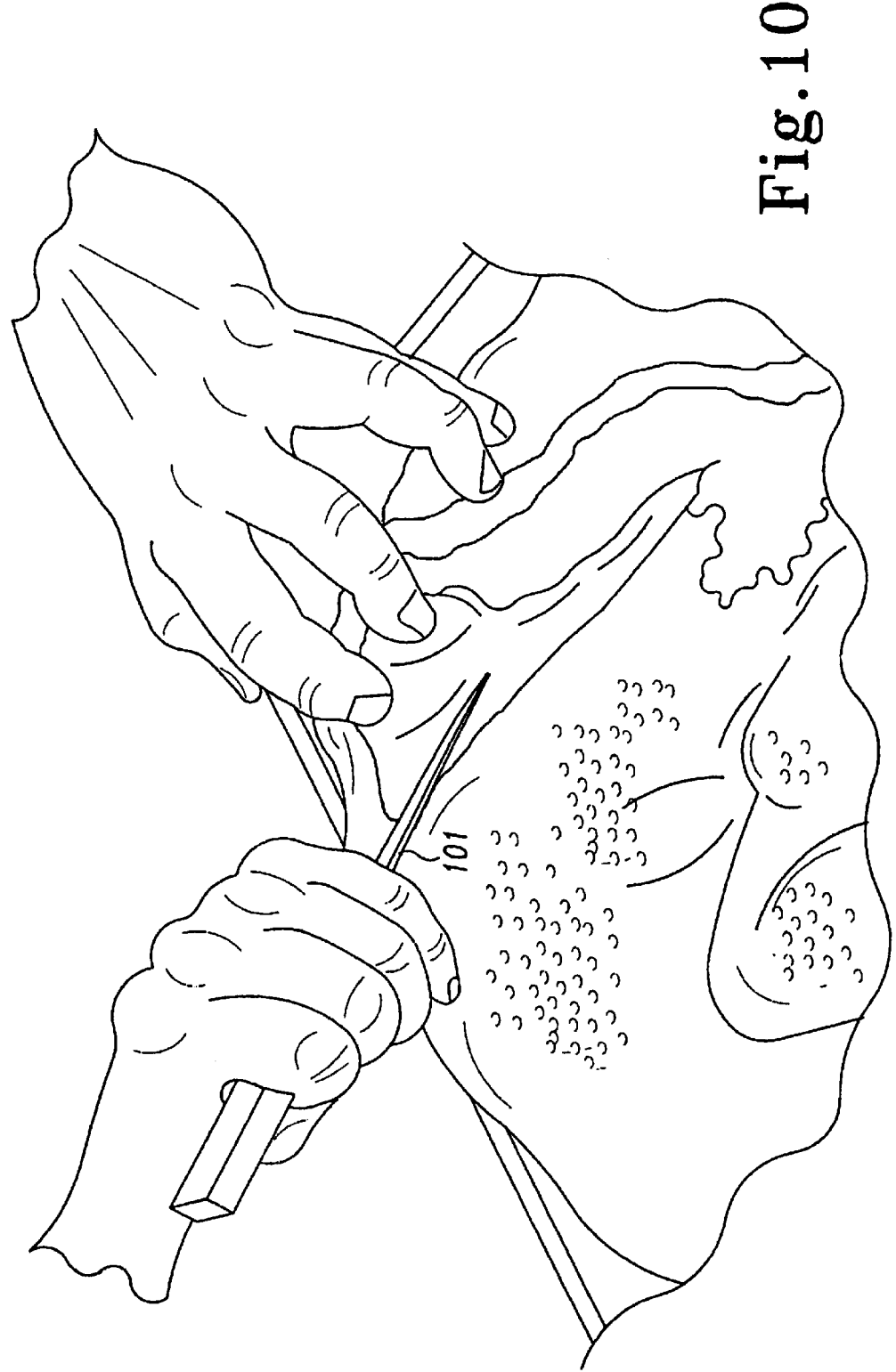
FIG. 10 is a perspective view illustrating separation of flesh in a cavity below the rib cage from the backbone.
Figure 11:
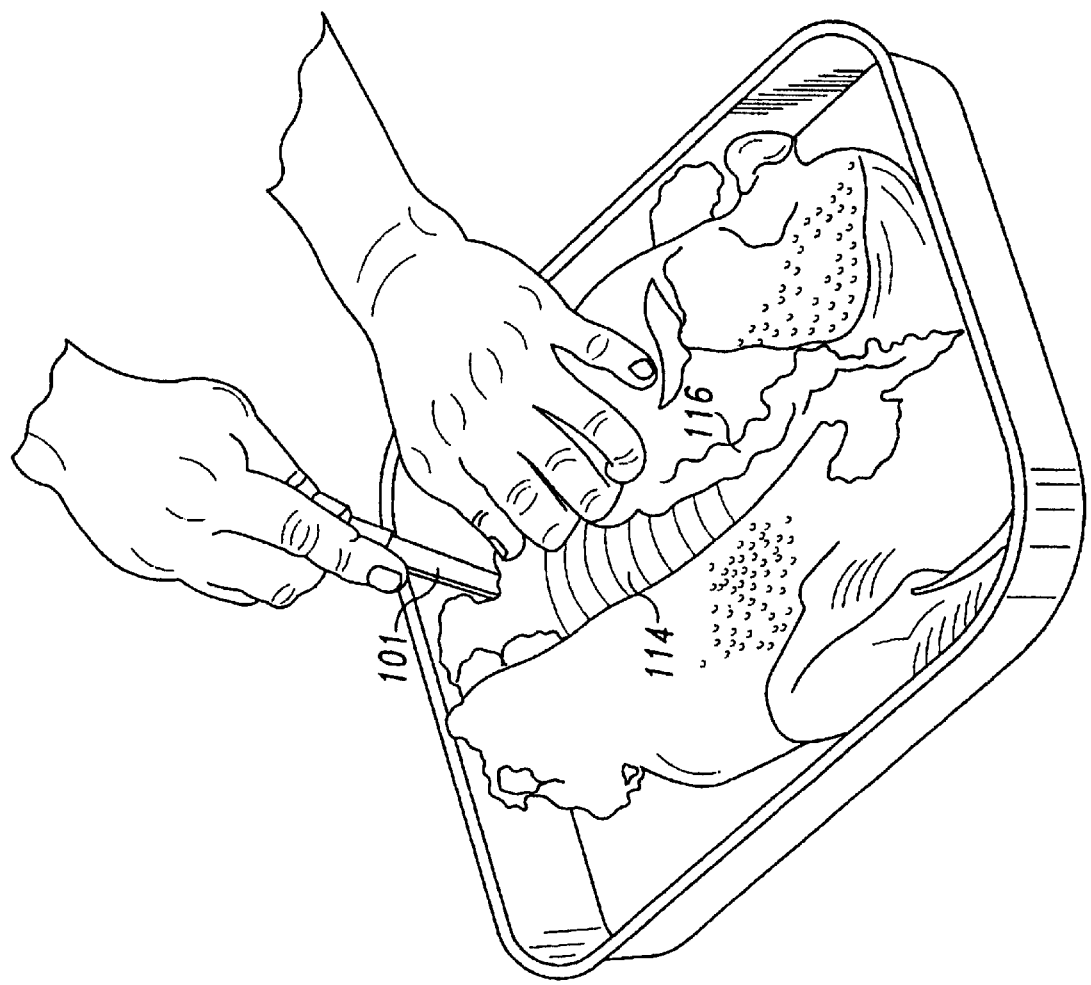
FIG. 11 is a perspective view illustrating severing a joint to permit removal of a thigh bone.
Figure 12:
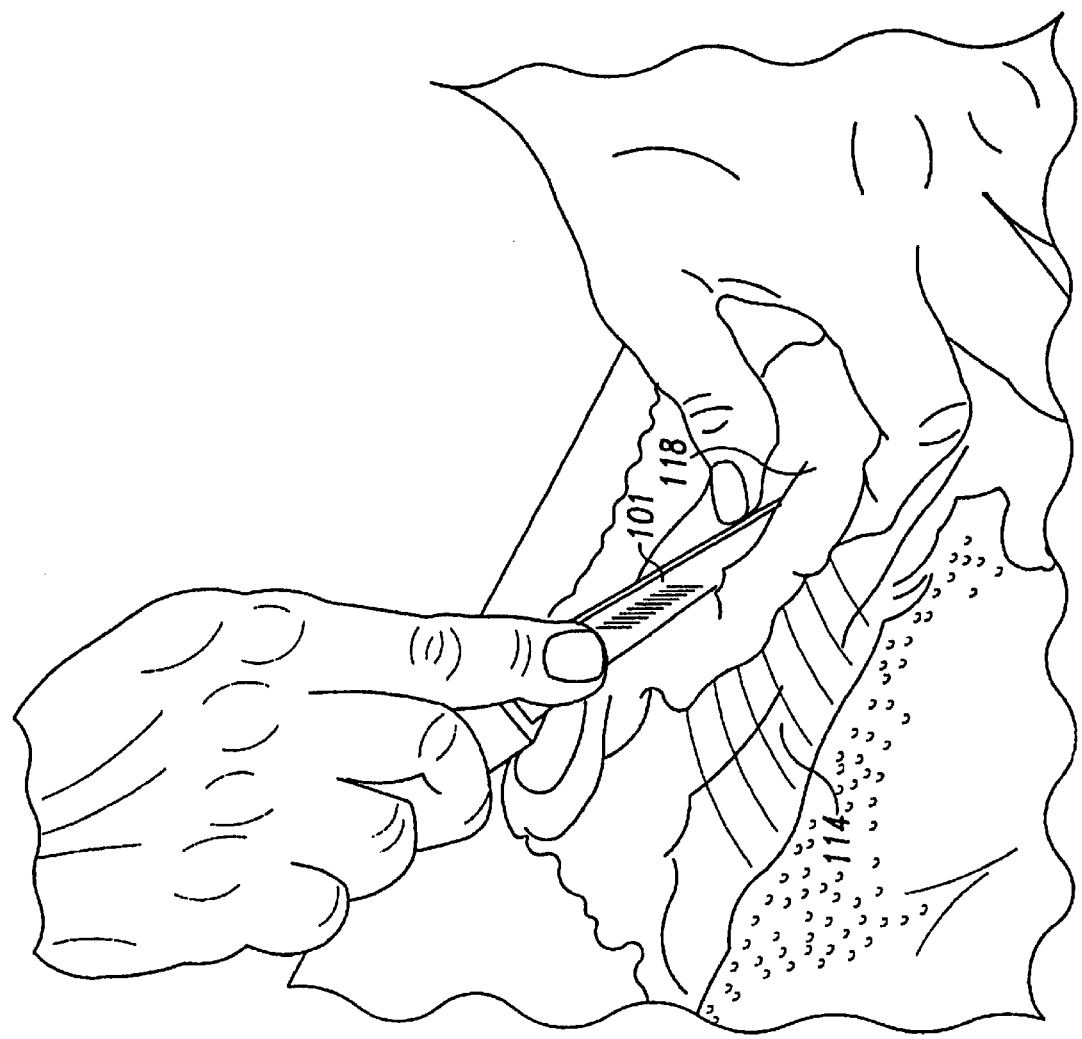
FIG. 12 is a perspective view illustrating the position for an incision along a shoulder bone.
Figure 13:
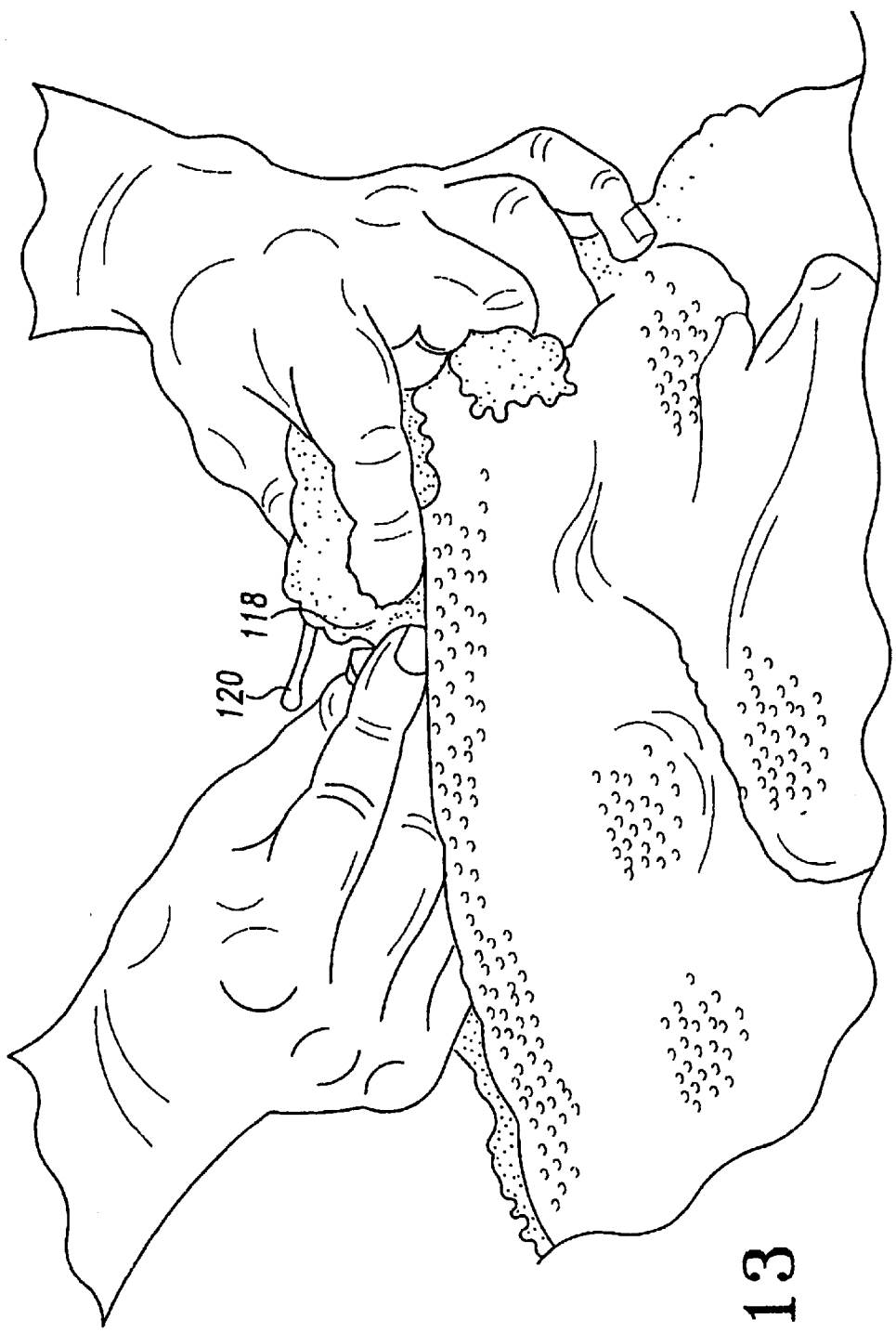
FIG. 13 is a perspective view illustrating manual separation of a shoulder bone from the surrounding flesh.

At the rear of the ribcage, there is a thicker, roughly lenticular portion of the flesh. The knife should again be turned in order to permit deeper cutting, in order to free this thicker portion from the backbone, as shown in FIG. 10. Once the thicker scallop has been cut out, the joint of the thighbone should be severed from the hip, as shown in FIG. 11. Then an incision is made in the shoulder flesh 118 surrounding the shoulder bone, as shown in FIG. 12. The flesh 118 is then manually pulled back along the shoulder bone 120 to free it completely from the bone while leaving it attached to the flesh of the back as shown in FIG. 13. One method of doing so is to squeeze the tip of the bone 118 between the thumb and forefinger and push them down along the length of the bone 120.

Figure 14:
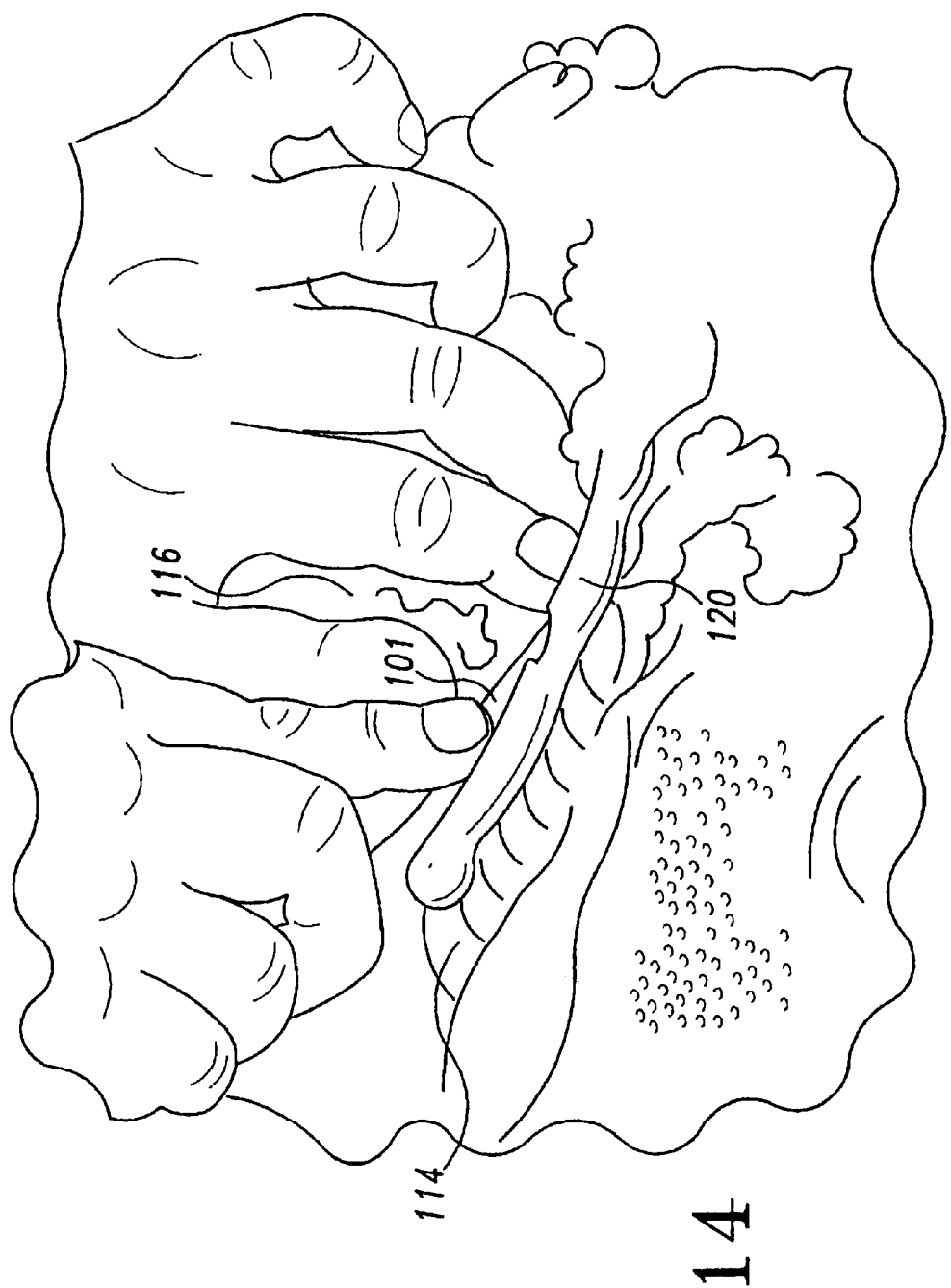
FIG. 14 is a perspective view illustrating a continuation of separation of the backbone and ribs from the flesh.

It will be appreciated that the severing of the thighbone from the hip, as shown in FIG. 11, can equally well be performed after removing the flesh from the shoulder bone, as shown in FIGS. 12–13. In any event, once these steps are performed, the series of passes is continued along the ribs to continue to cut away the flesh of the back 116 from the ribcage 114, as shown in FIG. 14. The passes should be continued until the incision along the ribs reaches all the way around to the breastbone.

Figure 15:
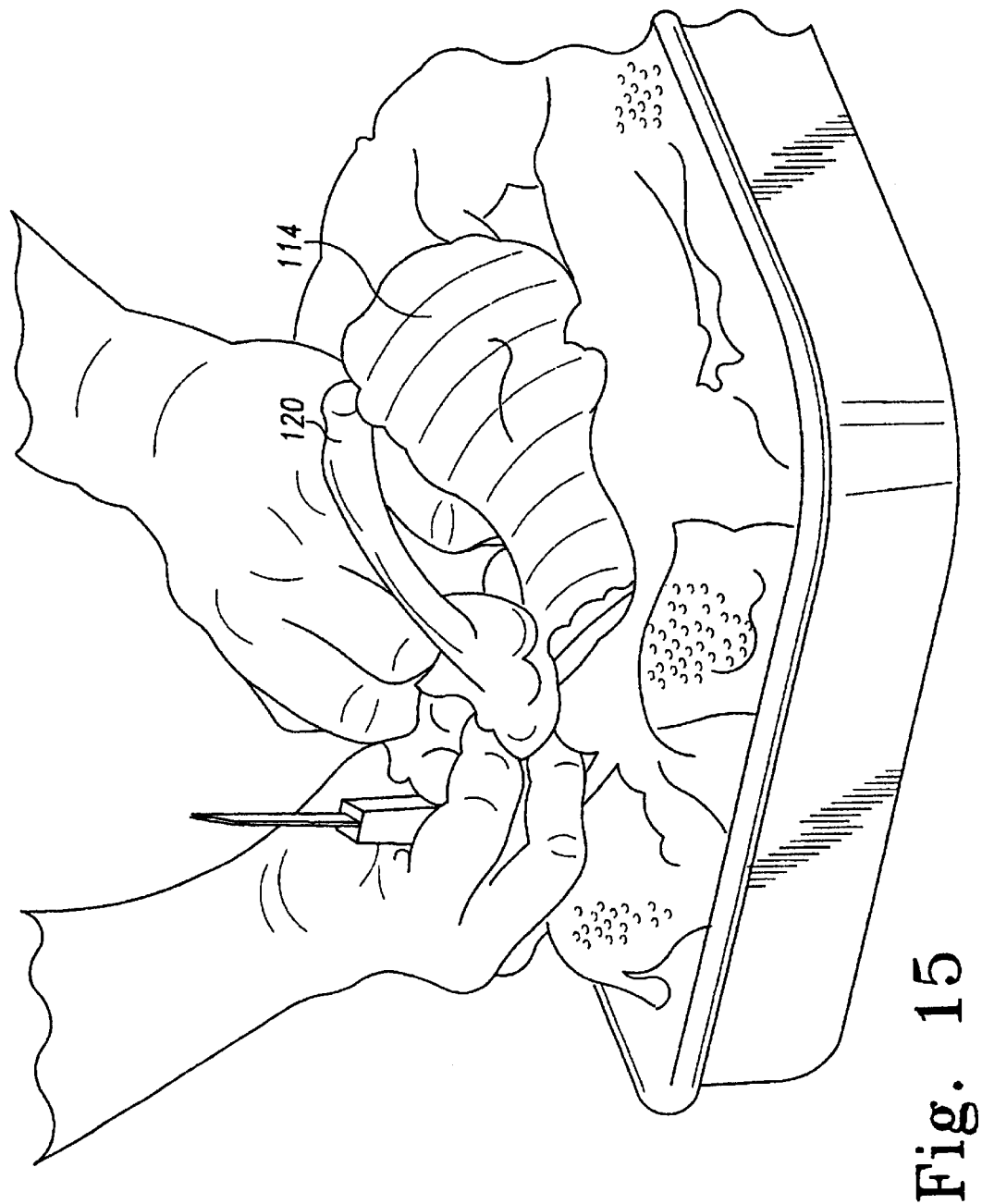
FIG. 15 is a perspective view illustrating how to grip the neck and ribcage in preparation for removing them by pulling them away from the rest of the turkey.
Figure 16:
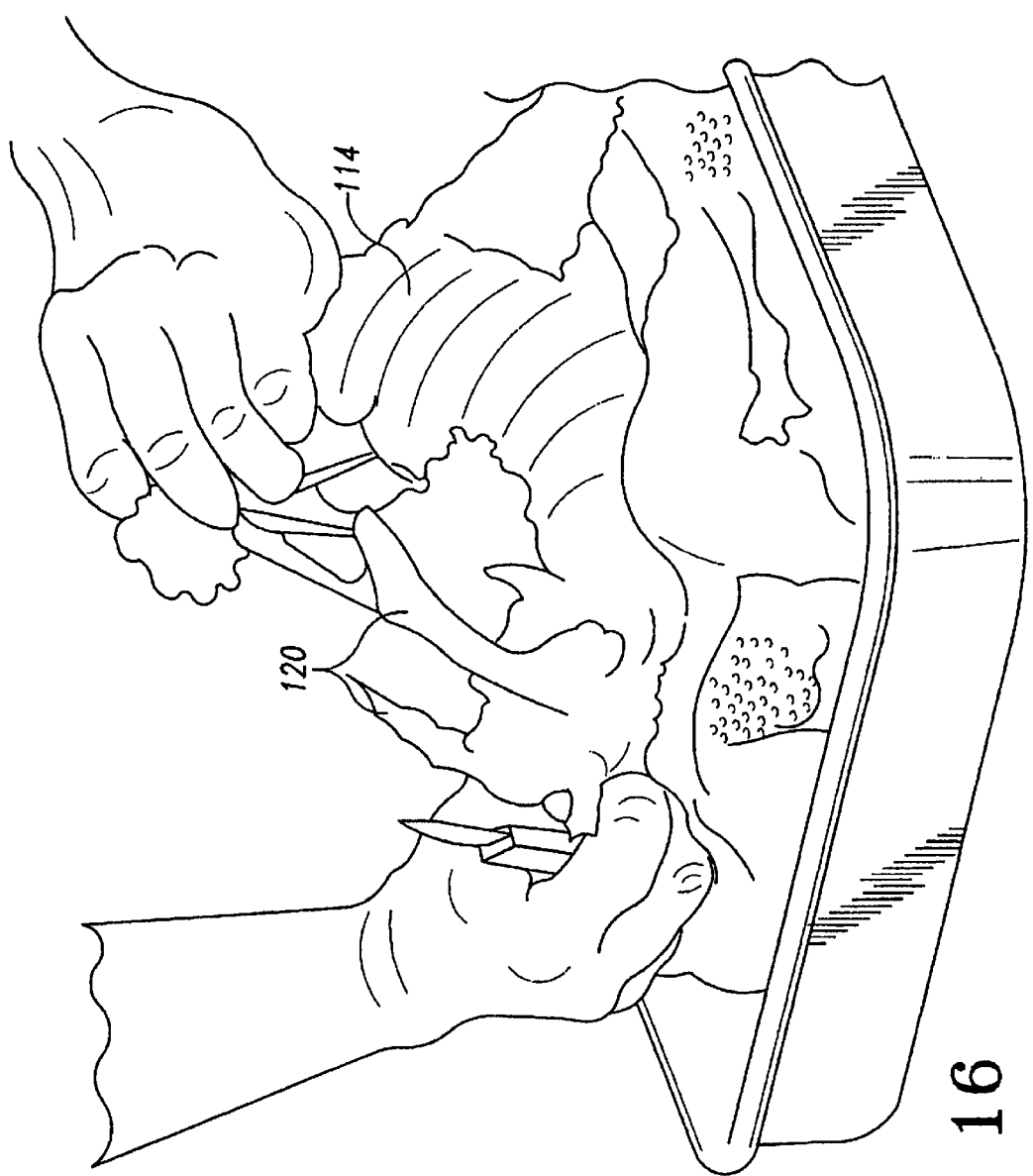
FIG. 16 is a perspective view illustrating removal of the neck and ribcage by pulling.

The entire process illustrated in FIGS. 8 through 14 are then repeated on the other side of the turkey. At this point, the bulk of the ribcage will be exposed. The neck of the turkey is then grasped firmly in one hand, with the other hand firmly holding down the rest of the turkey, as shown in FIG. 15. The ribcage is then pulled from the turkey, as shown in FIG. 16.

Figure 17:
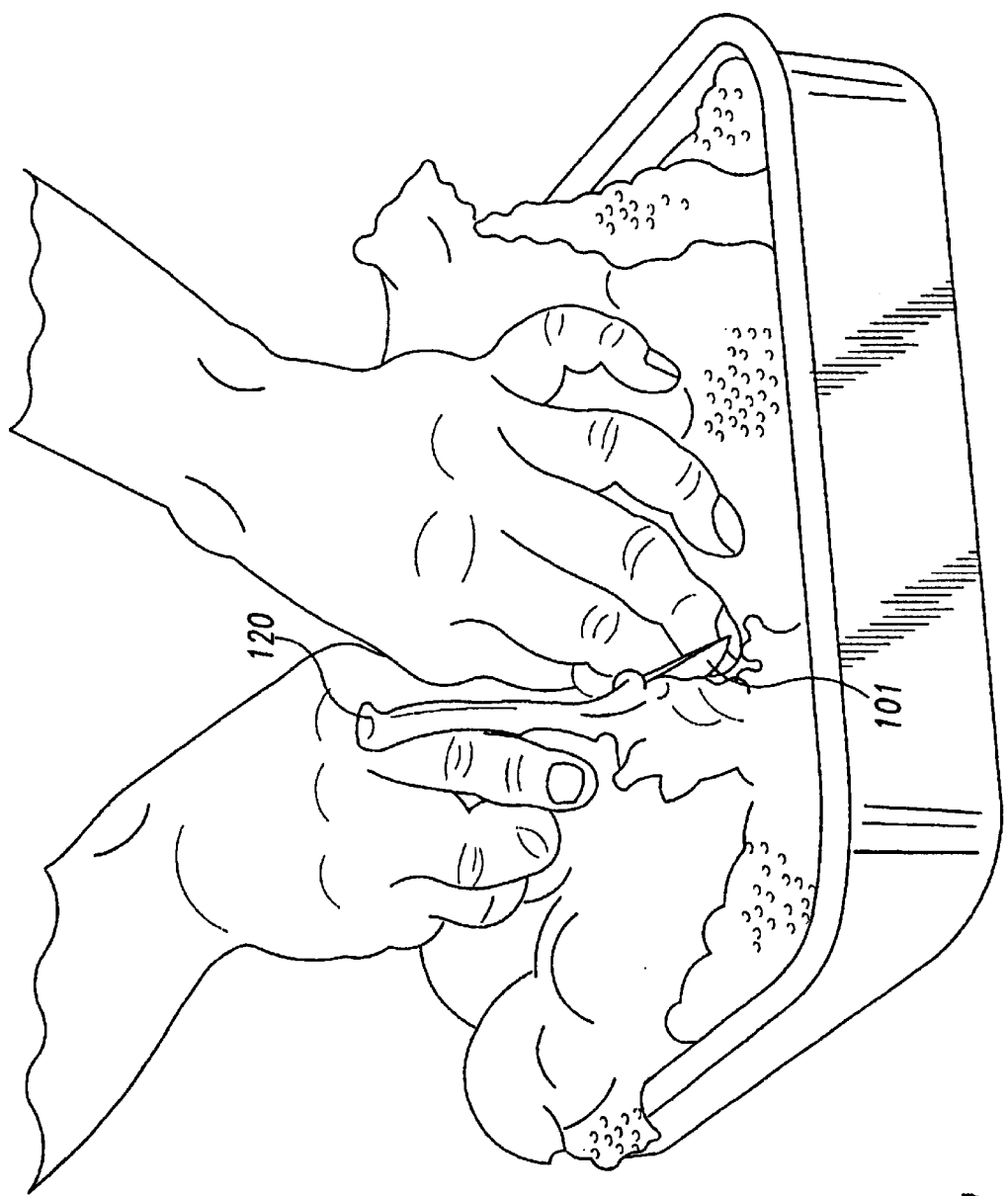
FIG. 17 is a perspective view illustrating separating the breastbone from the surrounding flesh.
Figure 18:
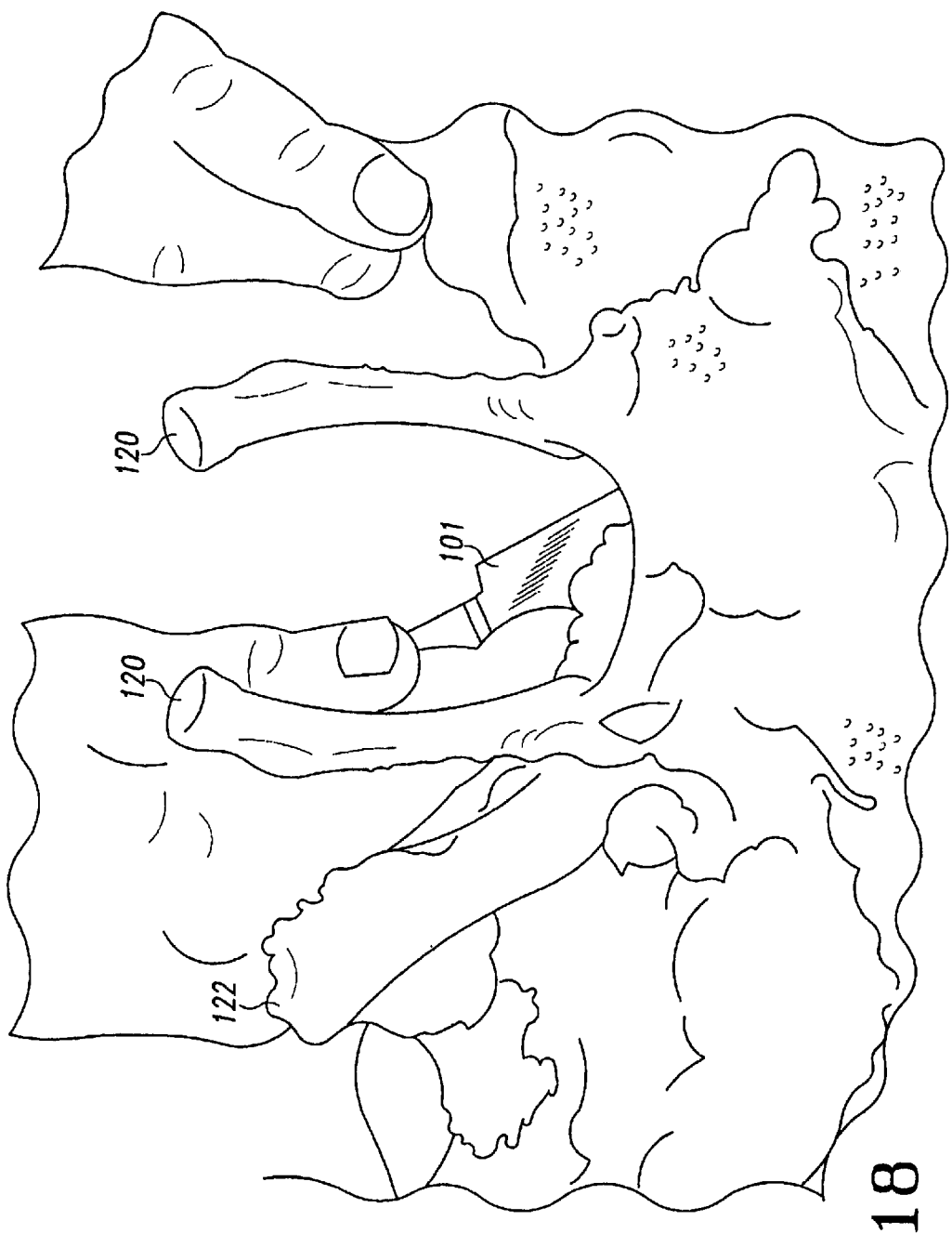
FIG. 18 is a perspective view illustrating separating the breastbone from the surrounding flesh.
Figure 19:
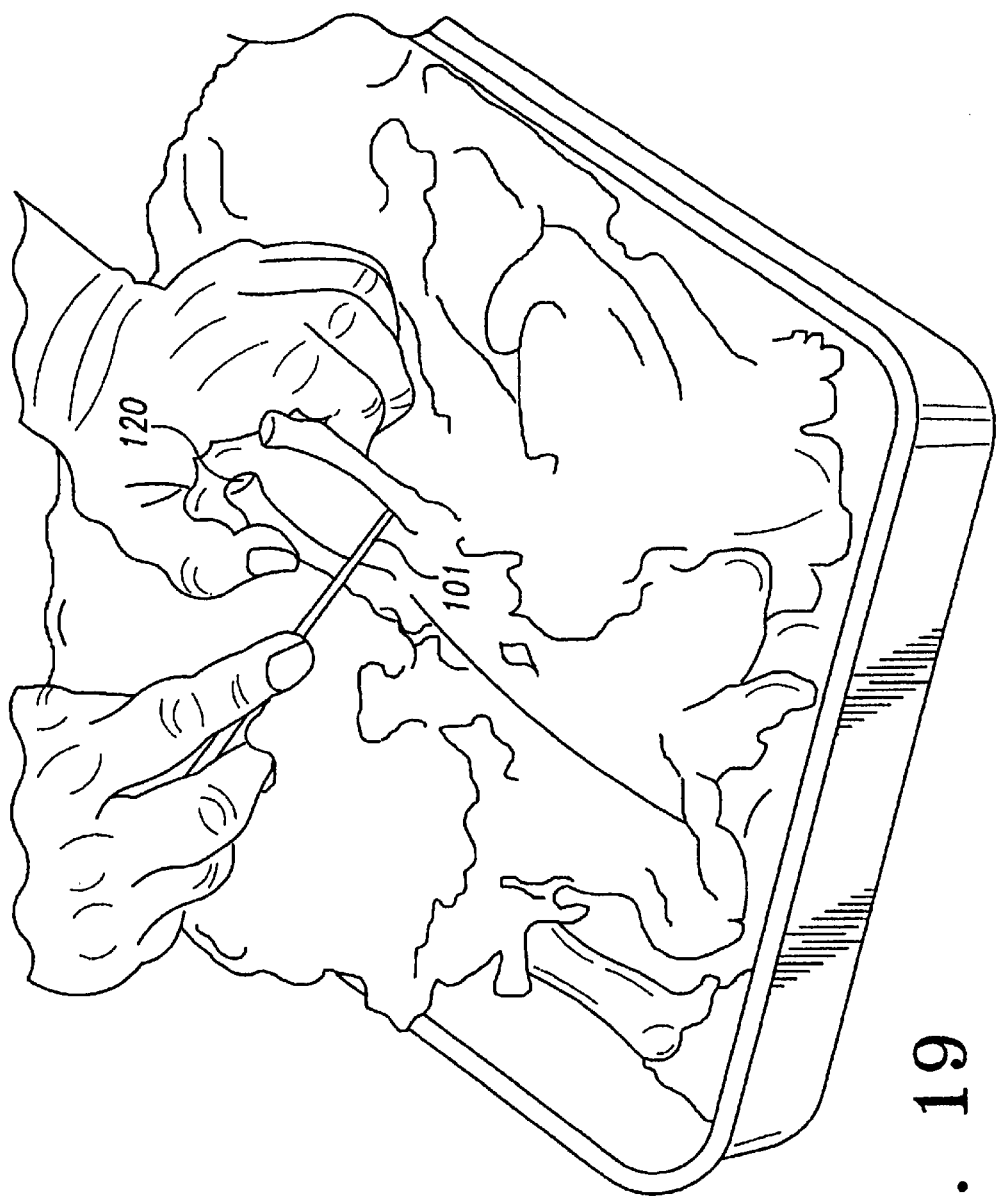
FIG. 19 is a perspective view illustrating separating the wishbone from the surrounding flesh.
Figure 20:
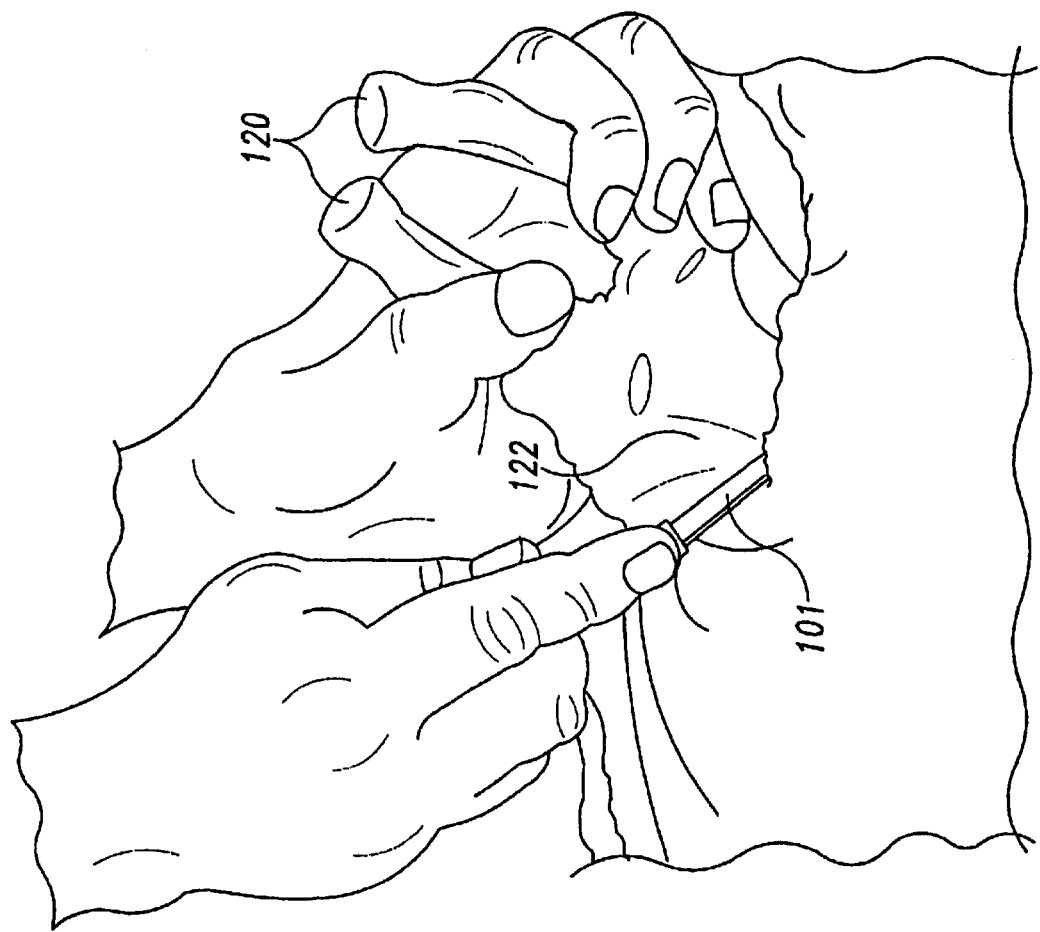
FIG. 20 is a perspective view illustrating separating the wishbone and breastbone from the surrounding flesh.
Figure 21:
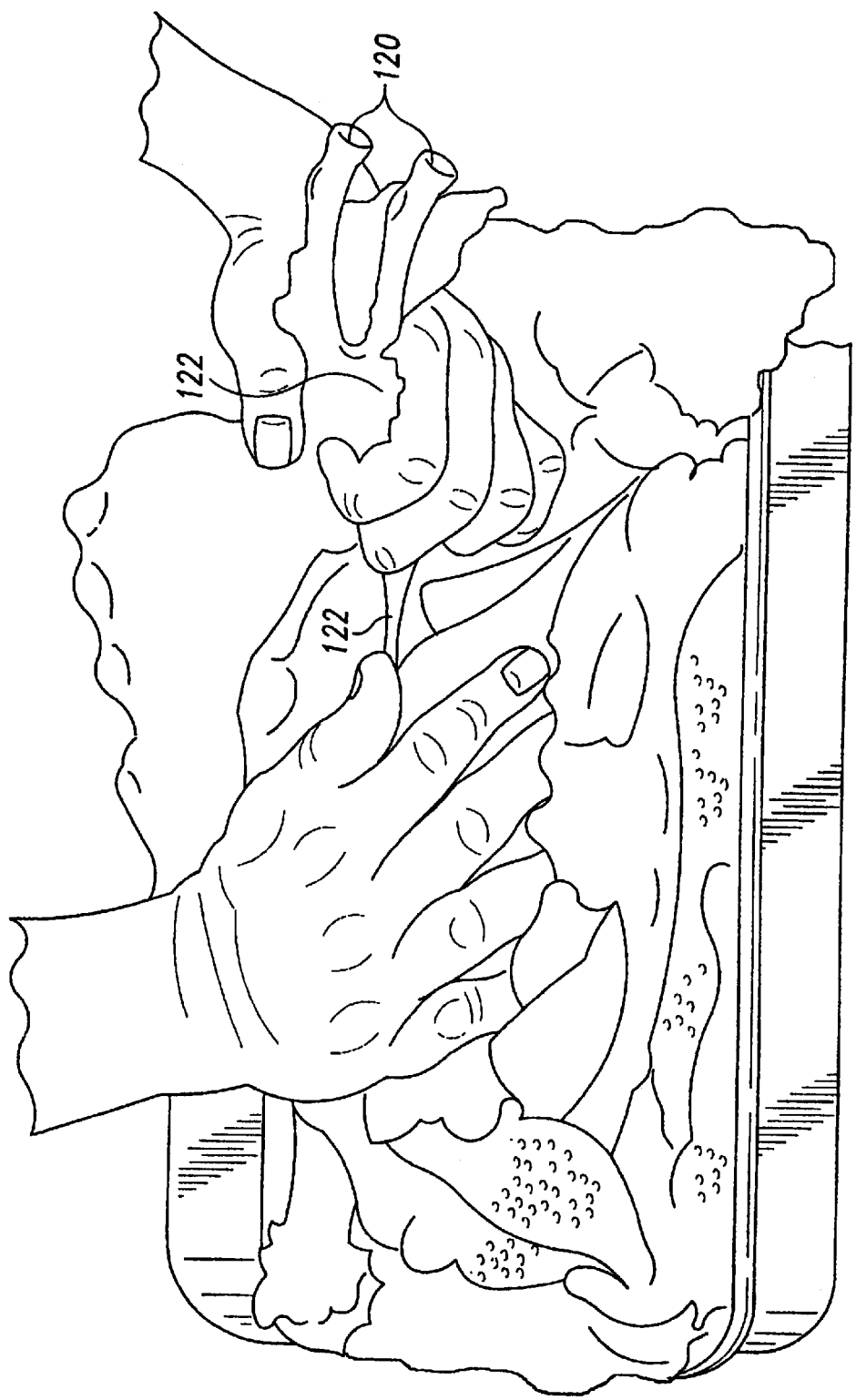
FIG. 21 is a perspective view illustrating removing the breastbone and wishbone by pulling them away from the rest of the turkey.
Figure 22:
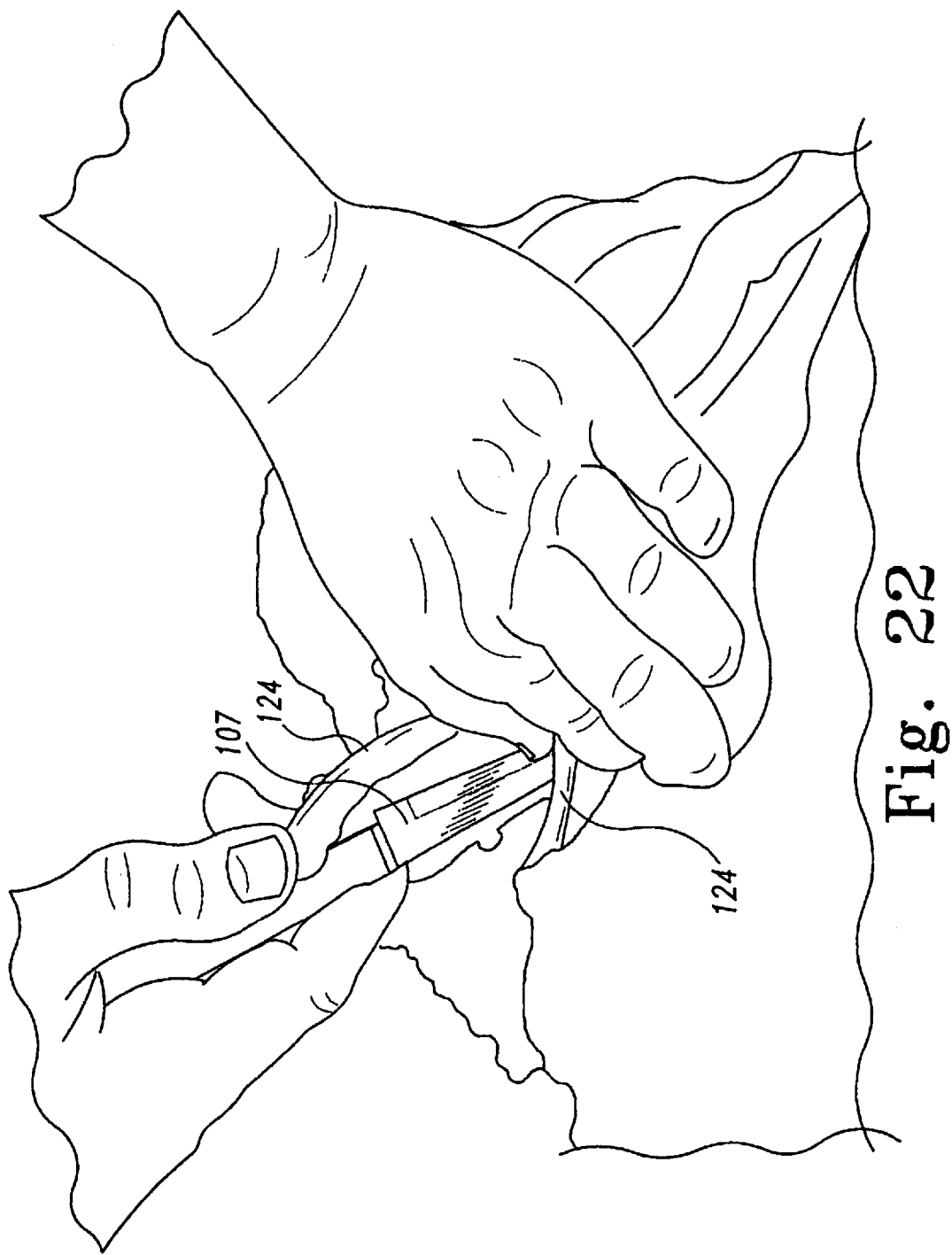
FIG. 22 is a perspective view illustrating a position for an incision along a thighbone.

The knife is then used to cut along the inside of the breastbone 122 to separate it from the flesh of the breast, as shown in FIGS. 17 and 18. The breastbone 122 is then gripped in one hand and lifted, in order to facilitate cutting the flesh away from the sides of the breastbone 122, as shown in FIGS. 19 and 20. The breastbone 122 can then be removed by pulling it free, as shown in FIG. 21, leaving the wishbone. As shown in FIG. 22, the wishbone 124 is then cut free and removed.

Figure 23:
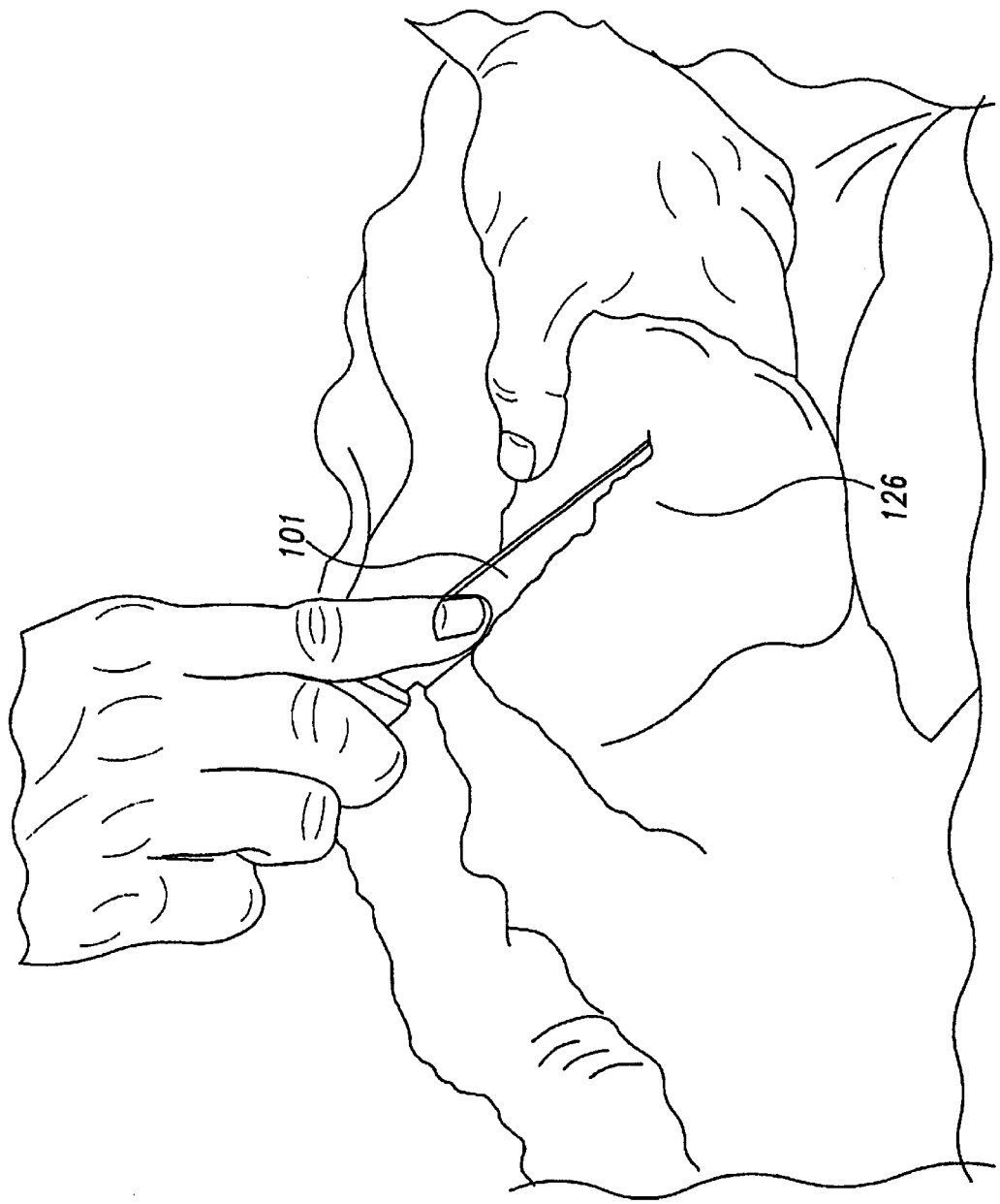
FIG. 23 is a perspective view illustrating an incision along a thighbone.
Figure 24:
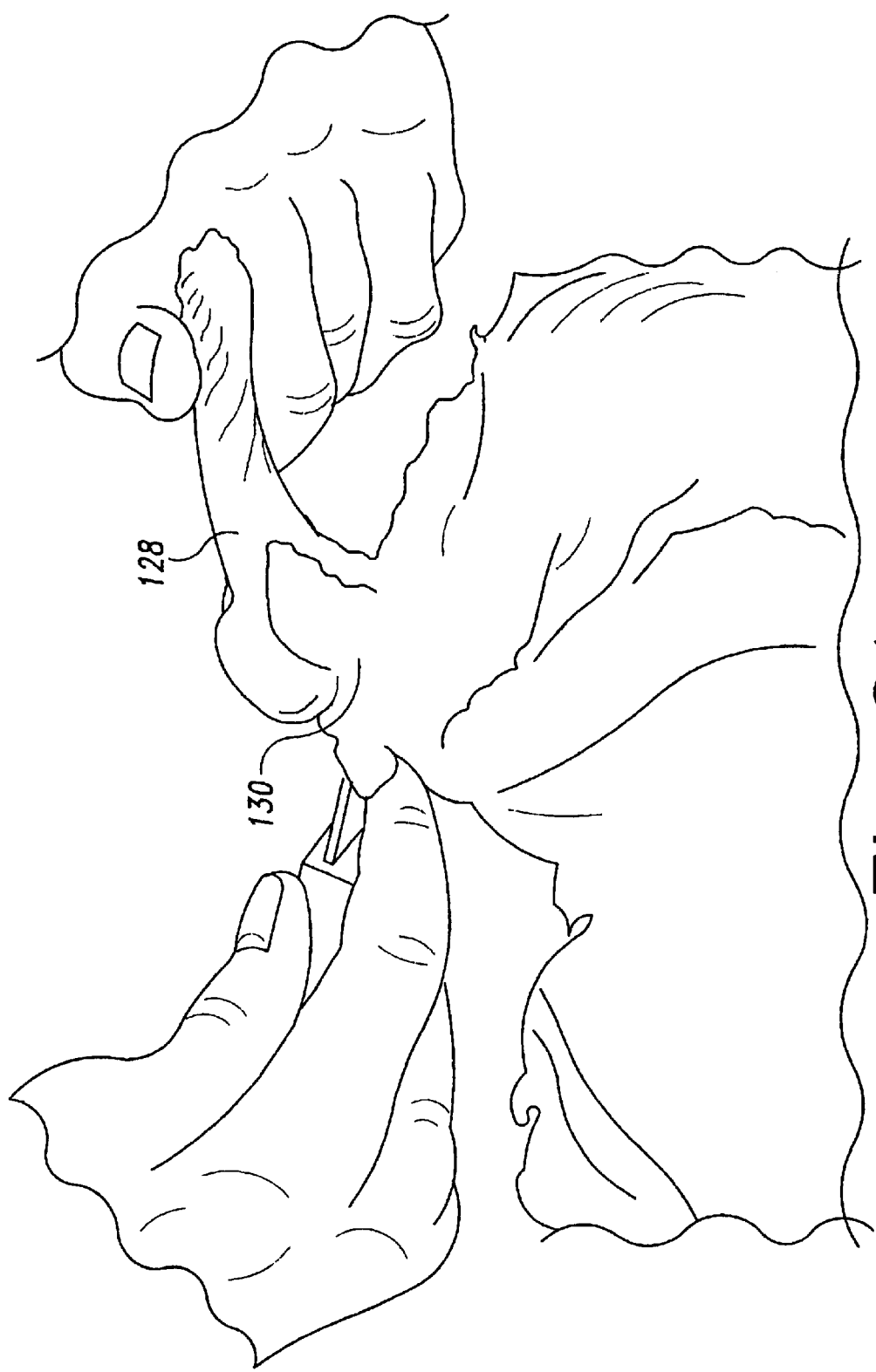
FIG. 24 is a perspective view illustrating severing a joint to permit removal of a thighbone.
Figure 25:
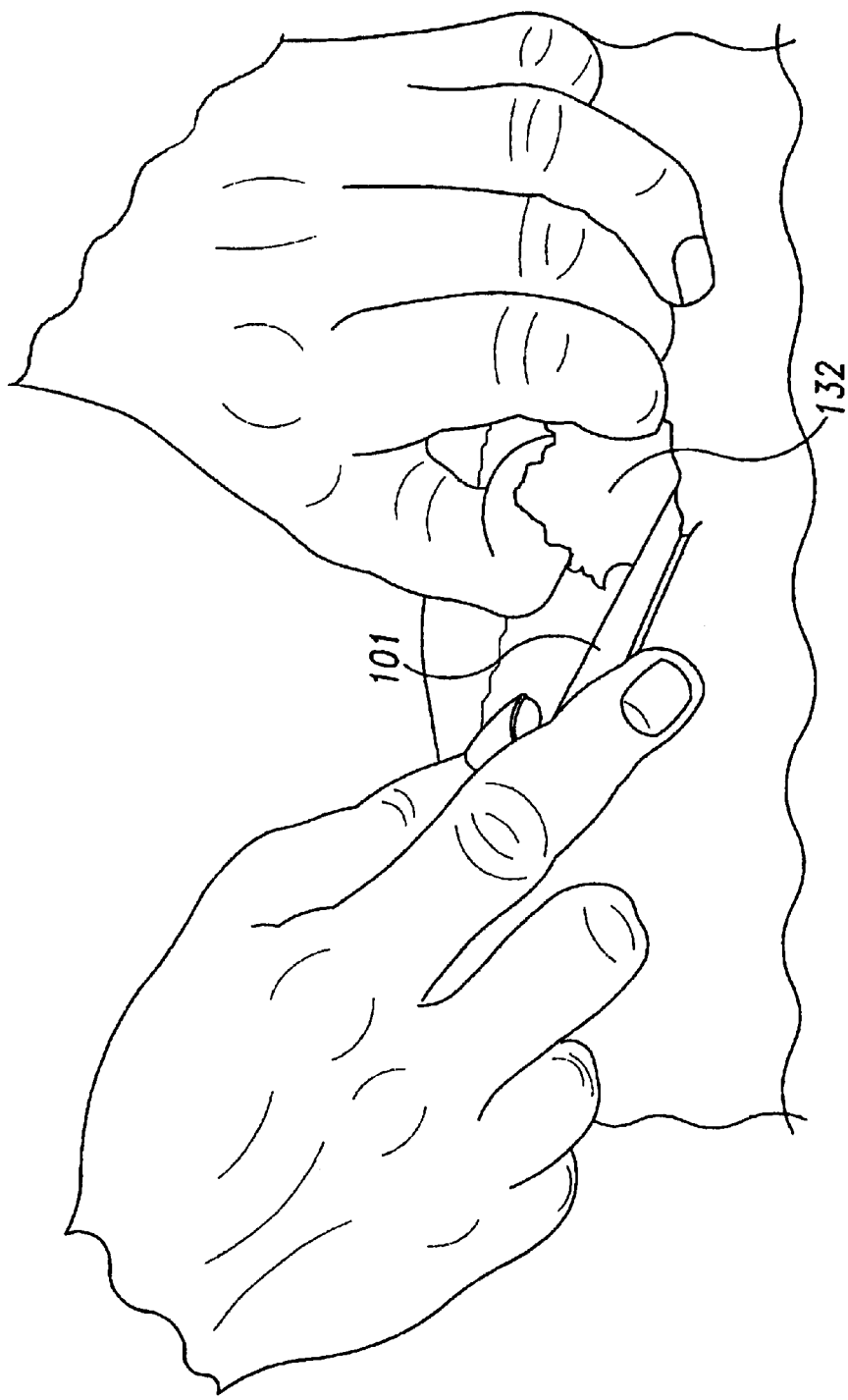
FIG. 25 is a perspective view illustrating positioning a remaining piece of cartilage to facilitate cutting it away from the rest of the turkey.

Next, the thighbones are removed. The thigh is lifted in one hand and felt to locate the bone, and then an incision is made along it. As shown in FIG. 23, using one hand the thighbone and surrounding flesh 126 can advantageously be elevated and held securely to facilitate making the incision with the other hand. As shown in FIG. 24, the thighbone 128 can then be gripped and lifted out, to expose the joint 130, which can then be easily cut to permit the bone 128 to be removed. This will leave a large piece of cartilage. As shown in FIG. 25, the piece of cartilage 132 should be gripped in one hand and lifted, so that it can be cut away.

Figure 26:
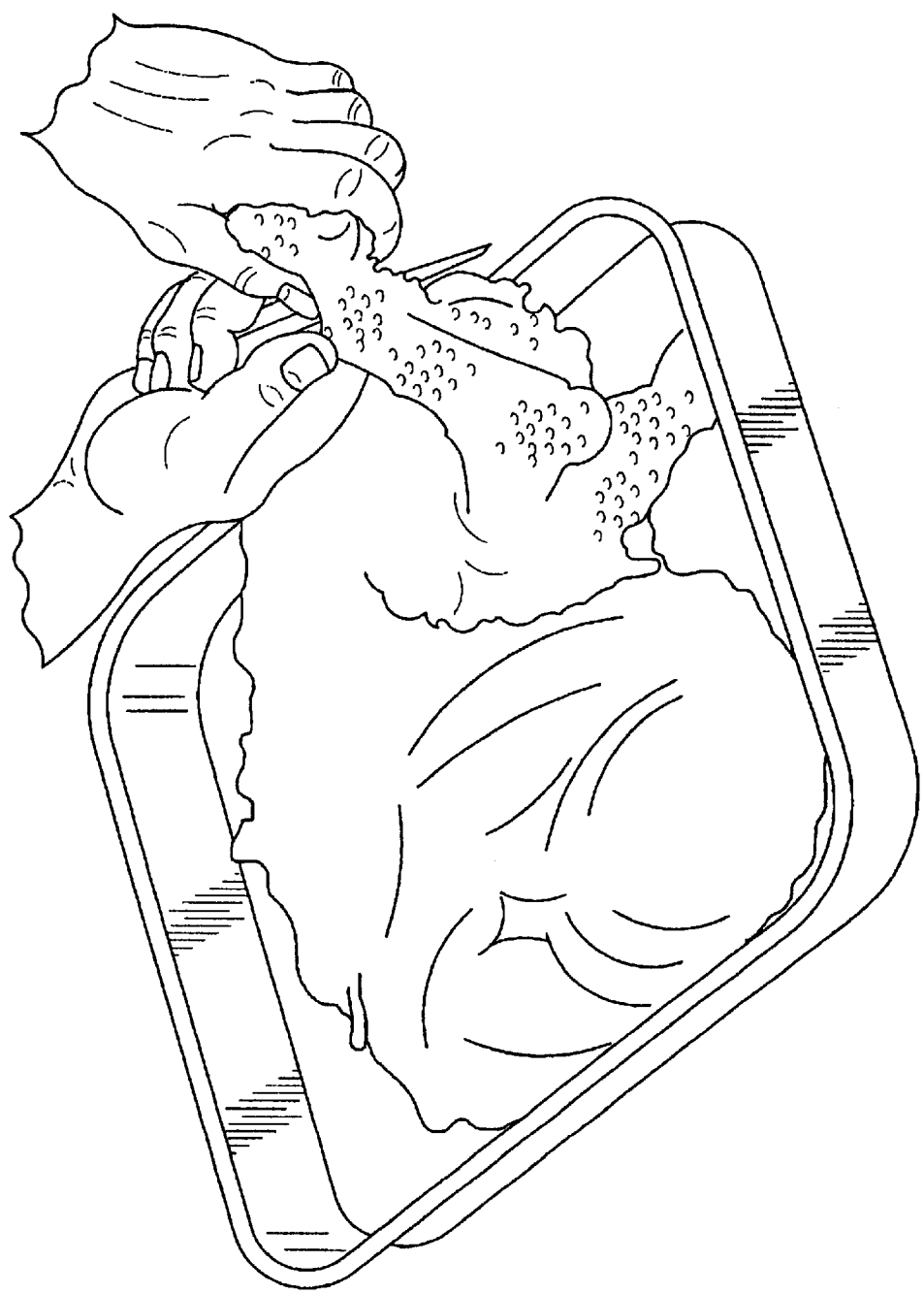
FIG. 26 is a perspective view illustrating cutting away the tail.

The entire tail section can now be cut away, as shown in FIG. 26. Alternatively, it can be left in place.

Figure 27:
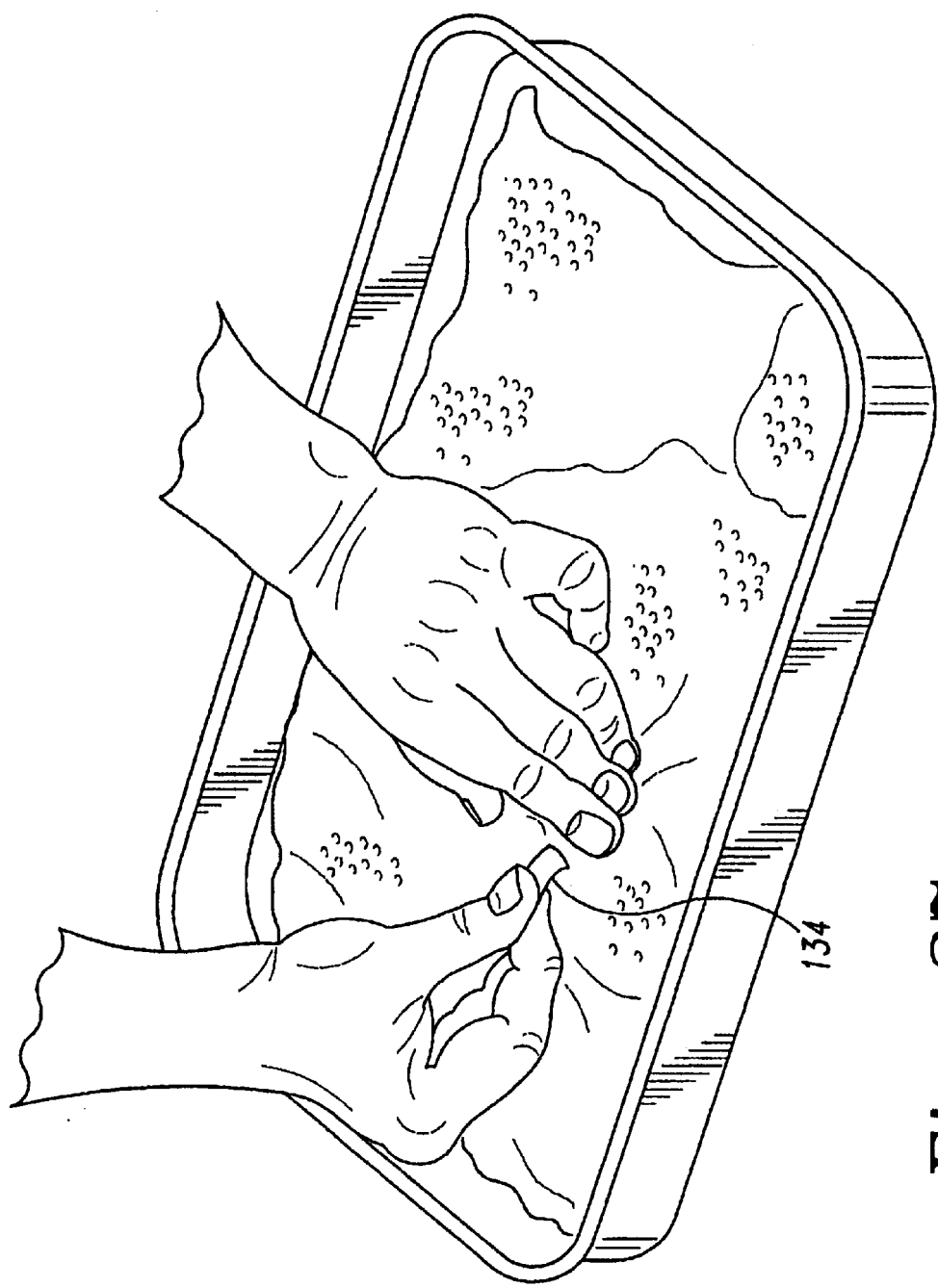
FIG. 27 is a perspective view illustrating insertion of a thermometer into the breast.

The entire turkey is then advantageously flipped over and arranged so that the skin completely covers the exposed flesh, in order to keep moisture in during cooking. A pop-out thermometer 134 is then advantageously inserted into the breast, as shown in FIG. 27, to indicate when the meat has reached the necessary temperature, for example, to kill all bacteria. The turkey is then ready to be served.

Figure 28:
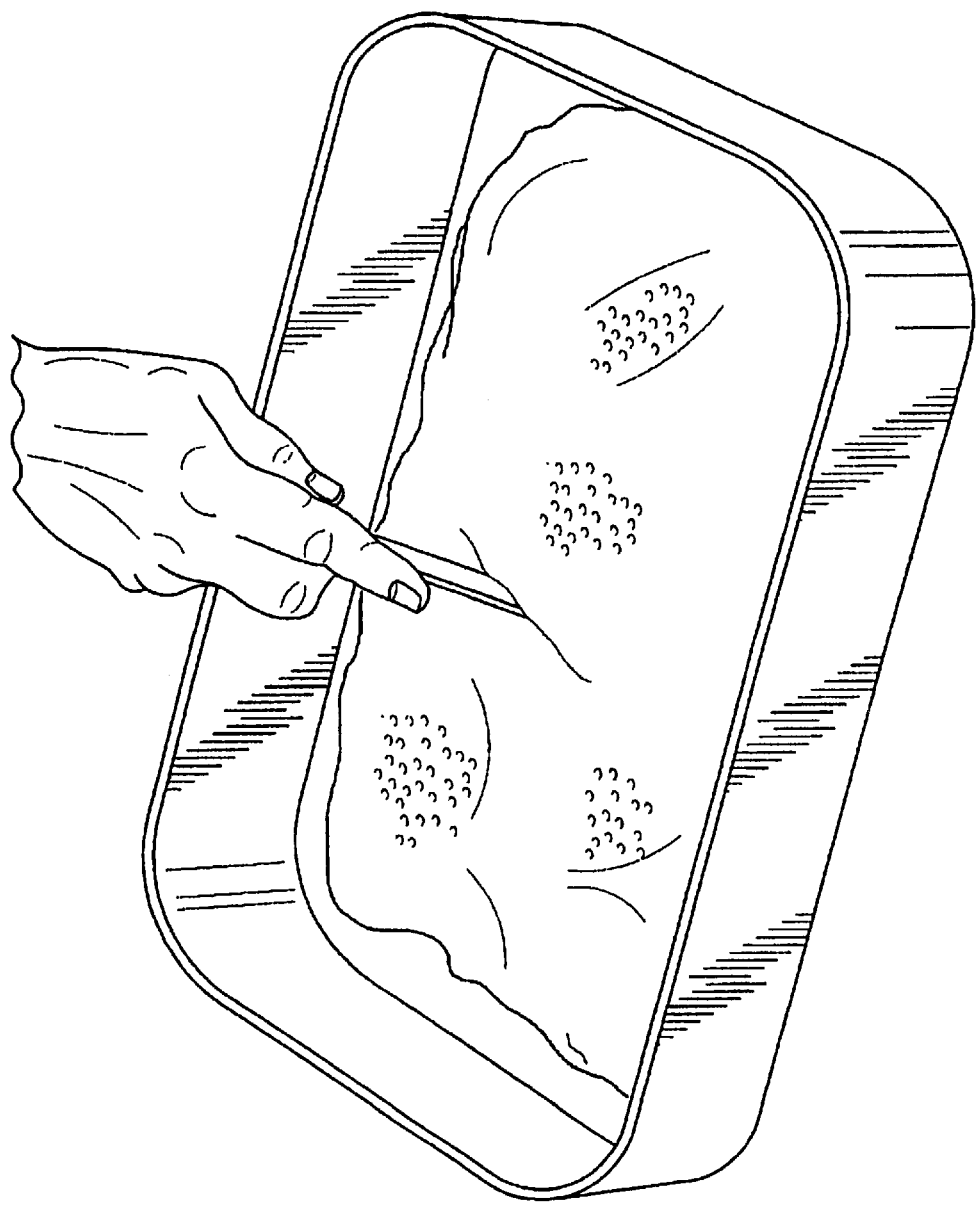
FIG. 28 is a perspective view illustrating cutting the turkey into two halves after cooking.
Figure 29:
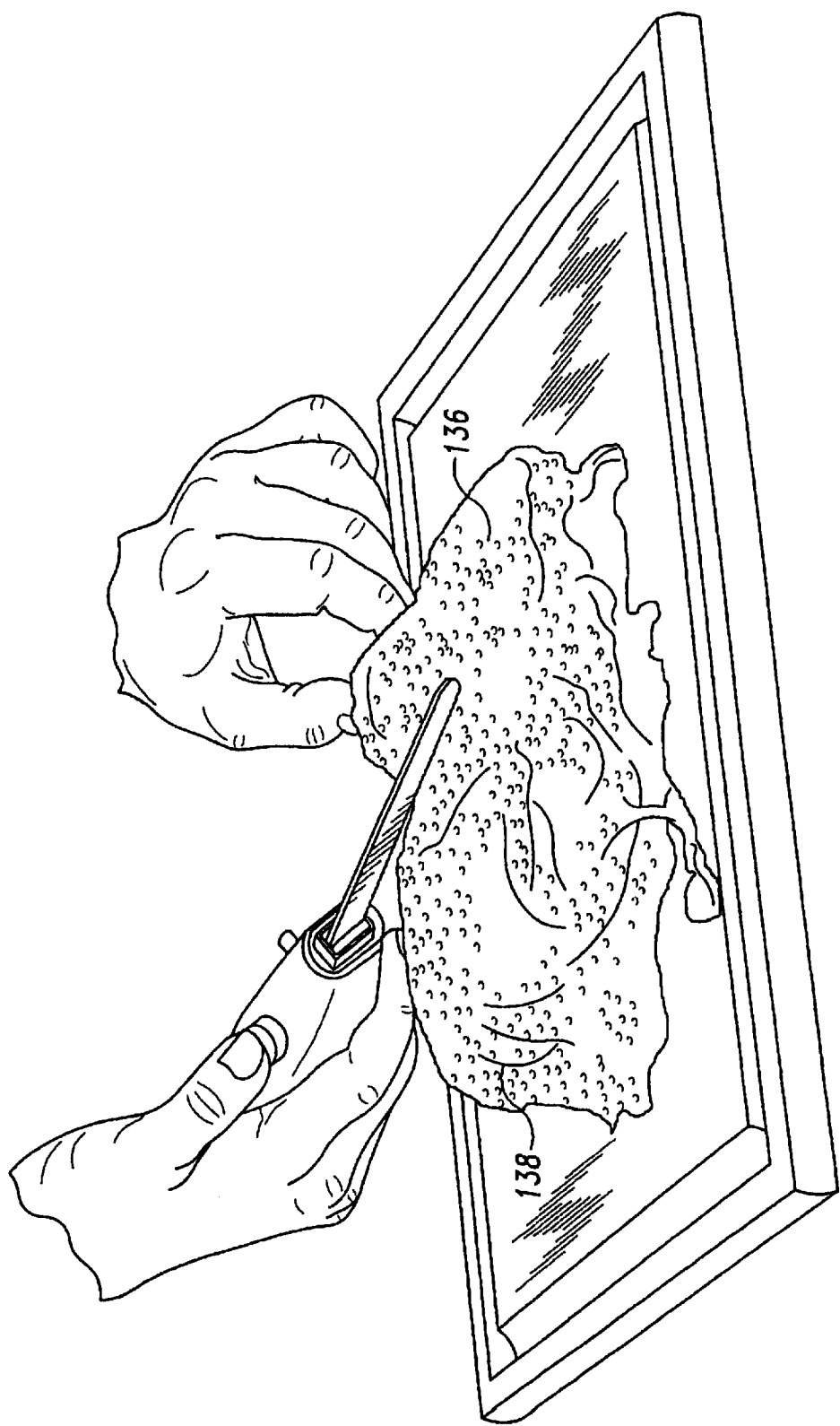
FIG. 29 is a perspective view illustrating a position for a first cut for carving a half of the turkey.
Figure 30:
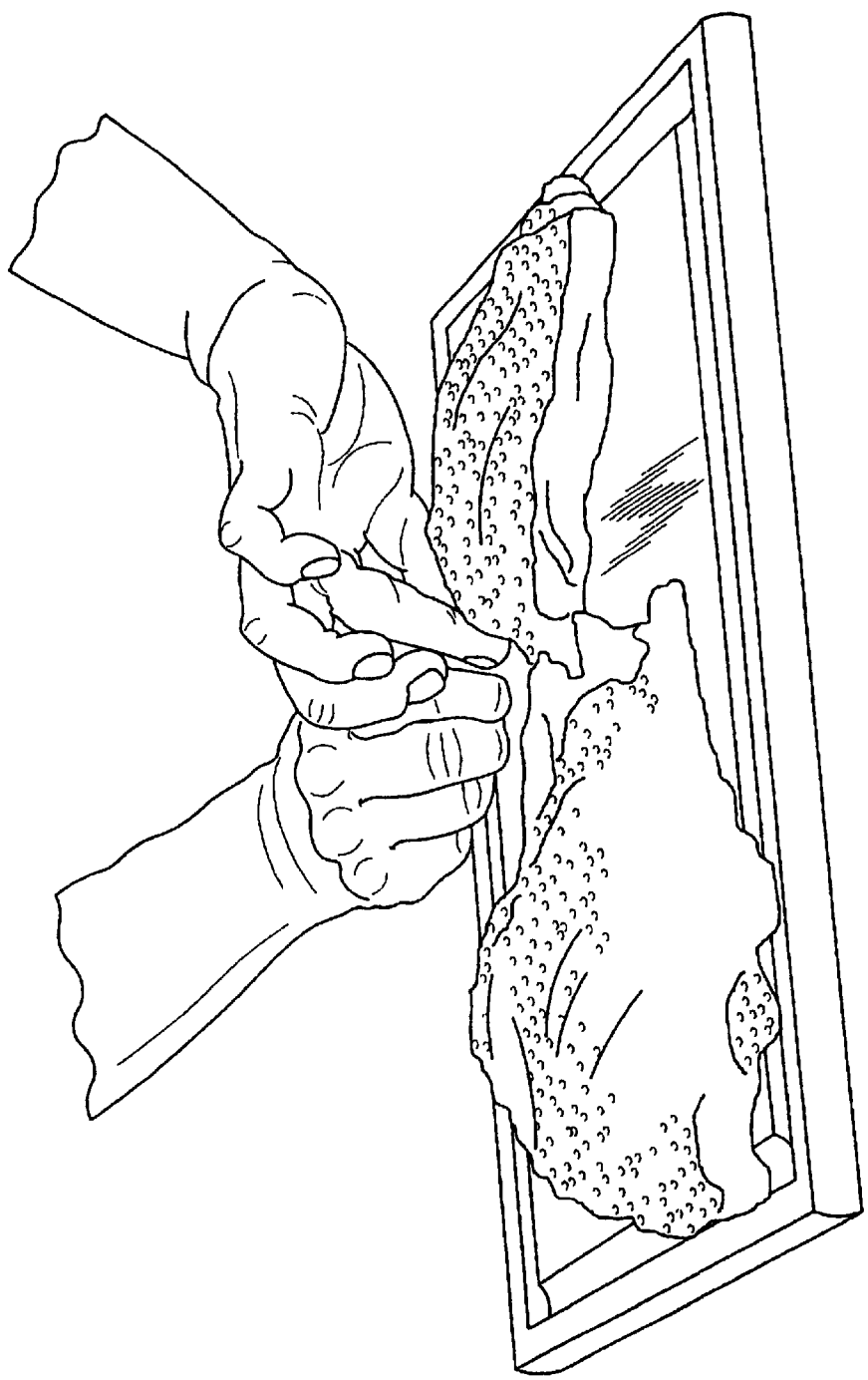
FIG. 30 is a perspective view illustrating how to grip a remaining small thighbone for removal by pulling it out of the half turkey.
Figure 31:
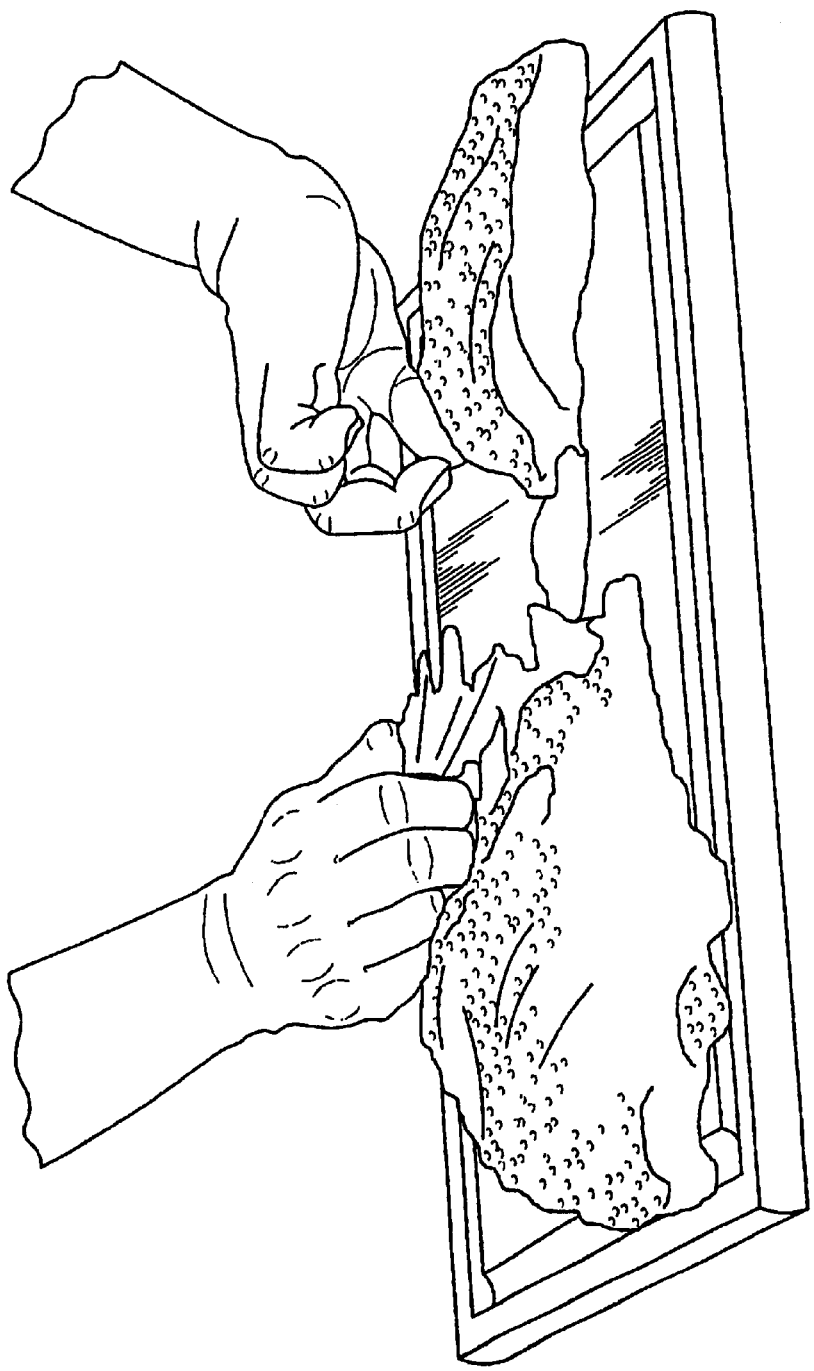
FIG. 31 is a perspective view illustrating the small thighbones after pulling them from the half turkey.

After cooking, the turkey can easily be cut into halves, as shown in FIG. 28. The halves are easily carved, due to the absence of bones. One of the halves is best carved by first cutting the thigh and leg portion 136 from the breast and wing portion 138, as shown in FIG. 29. The breast portion can then be cut into slices as desired. A remaining small thighbone can be removed, now that the flesh has been cooked, by gripping it with one hand, as shown in FIG. 30, and pulling. FIG. 31 illustrated the small bones and cartilage that will come free.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A method of de-boning a fowl, comprising:
    a) making an incision along a leg bone, exposing a leg joint between the leg bone and the rest of the fowl, and severing the leg joint, such that the leg bone is removed while leaving substantially all flesh of the leg attached to the rest of the fowl;
    b) removing two segments of a wing, such that a third segment of the wing is left attached to the rest of the fowl, making an incision along a wing bone of the third segment of the wing; exposing a wing joint between the wing bone of the third segment and the rest of the turkey, and severing the wing joint, such that the wing bone is removed while leaving the flesh of the wing attached to the rest of the fowl;
    c) making an incision along the back of the fowl, and separating the flesh of the back from the backbone and ribcage;
    d) severing a joint between the thighbone and the rest of the fowl;
    e) making an incision along a shoulderbone, such that flesh surrounding the shoulderbone can be pulled free while remaining attached to the rest of the fowl;
    f) removing a ribcage from the rest of the fowl;
    g) separating flesh from a breastbone and removing the breastbone;
    h) removing a wishbone;
    i) making an incision along a thighbone, exposing a thigh joint connecting the thighbone and the rest of the fowl, severing the thigh joint, such that the thighbone can be removed while leaving substantially all flesh of the thigh attached to the rest of the fowl.

2. The method of claim 1, wherein the steps (a) through (i) are performed in that order.

* * * * *